United States Patent
Wang et al.

(10) Patent No.: US 9,729,869 B2
(45) Date of Patent: *Aug. 8, 2017

(54) ADAPTIVE PARTITION SUBSET SELECTION MODULE AND METHOD FOR USE THEREWITH

(71) Applicant: ViXS Systems, Inc., Toronto (CA)

(72) Inventors: Jiao Wang, Toronto (CA); Avinash Ramachandran, Toronto (CA); Wilf Zhao, Maple (CA)

(73) Assignee: ViXS Systems, Inc., Toronto (CA)

( * ) Notice: Subject to any disclaimer, the term of this patent is extended or adjusted under 35 U.S.C. 154(b) by 755 days.

This patent is subject to a terminal disclaimer.

(21) Appl. No.: 14/047,197

(22) Filed: Oct. 7, 2013

(65) Prior Publication Data

US 2014/0105275 A1 Apr. 17, 2014
US 2017/0188024 A9 Jun. 29, 2017

Related U.S. Application Data

(63) Continuation of application No. 12/413,055, filed on Mar. 27, 2009, now Pat. No. 8,599,921, which is a continuation-in-part of application No. 12/039,612, filed on Feb. 28, 2008, now Pat. No. 8,743,972.

(60) Provisional application No. 61/015,357, filed on Dec. 20, 2007.

(51) Int. Cl.
| | |
|---|---|
| *H04N 7/12* | (2006.01) |
| *H04N 19/105* | (2014.01) |
| *H04N 19/56* | (2014.01) |
| *H04N 19/513* | (2014.01) |
| *H04N 19/61* | (2014.01) |
| *H04N 19/109* | (2014.01) |
| *H04N 19/16* | (2014.01) |
| *H04N 19/57* | (2014.01) |

(52) U.S. Cl.
CPC ..... *H04N 19/00024* (2013.01); *H04N 19/105* (2014.11); *H04N 19/109* (2014.11); *H04N 19/16* (2014.11); *H04N 19/513* (2014.11); *H04N 19/56* (2014.11); *H04N 19/57* (2014.11); *H04N 19/61* (2014.11)

(58) Field of Classification Search
CPC ....... H04N 19/00024; H04N 19/00036; H04N 19/00224; H04N 19/0066; H04N 19/00678; H04N 19/00781; H04N 19/105; H04N 19/109
See application file for complete search history.

(56) References Cited

U.S. PATENT DOCUMENTS

| | | | | |
|---|---|---|---|---|
| 7,362,804 B2 * | 4/2008 | Novotny et al. | ........ | H04N 19/70 375/240.01 |
| 8,743,972 B2 * | 6/2014 | Dong | ................... | H04N 19/159 375/240.12 |
| 9,225,996 B2 * | 12/2015 | Ramachandran | .... | H04N 19/105 |

* cited by examiner

*Primary Examiner* — Nhon Diep
(74) *Attorney, Agent, or Firm* — Garlick & Markison; Bruce E. Stuckman

(57) ABSTRACT

A partition subset selection module selects a subset of available partitions for a macroblock pair of the plurality of macroblock pairs, based on motion search motion vectors generated by a motion search section, and further based on a macroblock adaptive frame and field indicator. A motion refinement module generates refined motion vectors for the macroblock pair, based on the subset of available partitions for a macroblock pair.

10 Claims, 18 Drawing Sheets

Video encoding operation

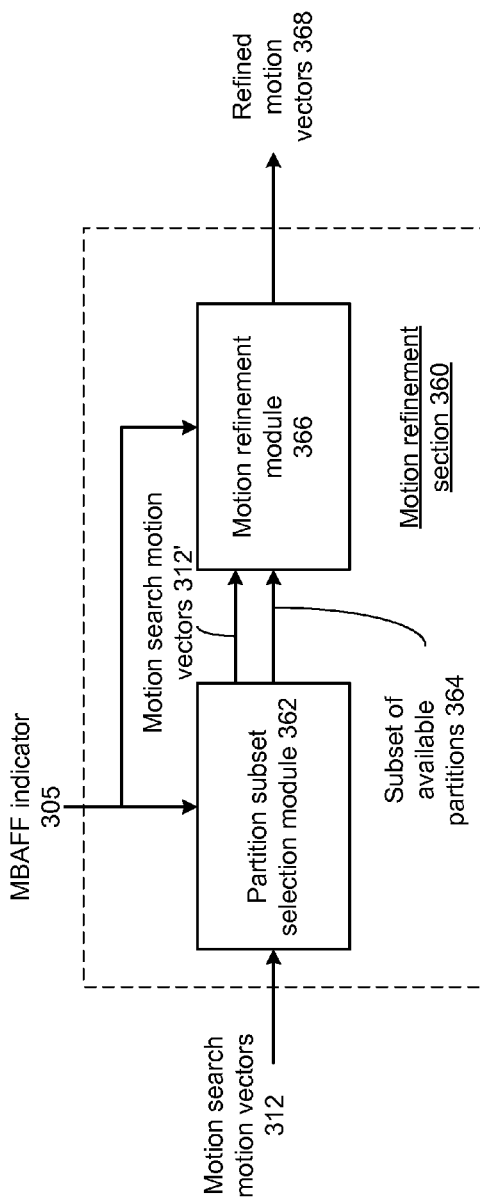
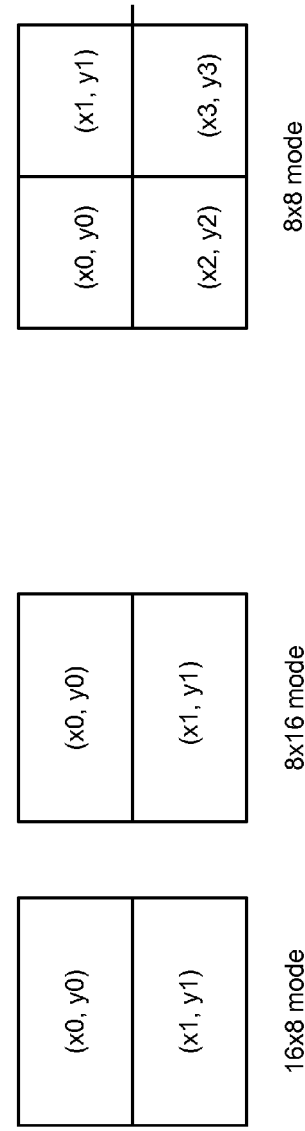
FIG. 19
FIG. 20
FIG. 21

ADAPTIVE PARTITION SUBSET SELECTION MODULE AND METHOD FOR USE THEREWITH

CROSS REFERENCE TO RELATED PATENTS

The present U.S. Utility Patent Application claims priority pursuant to 35 U.S.C. §120, as a continuation, to the U.S. application Ser. No. 12/413,055, entitled ADAPTIVE PARTITION SUBSET SELECTION MODULE AND METHOD FOR USE THEREWITH, filed on Mar. 27, 2009, which is hereby incorporated herein by reference in its entirety and made part of the present U.S. Utility Patent Application for all purposes.

The present U.S. Utility Patent Application also claims priority pursuant to 35 U.S.C. §120 as a continuation-in-part of U.S. Utility application Ser. No. 12/039,612, entitled "CODING ADAPTIVE DEBLOCKING FILTER AND METHOD FOR USE THEREWITH", filed Feb. 28, 2008, issued as U.S. Pat. No. 8,743,972 on Jun. 3, 2014, which claims priority pursuant to 35 U.S.C. §119(e) to U.S. Provisional Application No. 61/015,357, entitled "CODING ADAPTIVE DEBLOCKING FILTER AND METHOD FOR USE THEREWITH", filed Dec. 20, 2007.

The present application is related to U.S. application Ser. No. 12/413,067, entitled, SCALED MOTION SEARCH SECTION WITH DOWNSCALING AND METHOD FOR USE THEREWITH, filed on Mar. 27, 2009.

TECHNICAL FIELD OF THE INVENTION

The present invention relates to encoding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

Efficient and fast encoding and decoding of video signals is important to the implementation of many video devices, particularly video devices that are destined for home use. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 19 presents a block diagram representation of a motion refinement section 360 in accordance with another embodiment of the present invention.

FIG. 20 presents a graphical representation of two modes of macroblock partitioning in accordance with an embodiment of the present invention.

FIG. 21 presents a graphical representation of another mode of macroblock partitioning in accordance with an embodiment of the present invention.

DETAILED DESCRIPTION OF THE INVENTION INCLUDING THE PRESENTLY PREFERRED EMBODIMENTS

Figure 1:
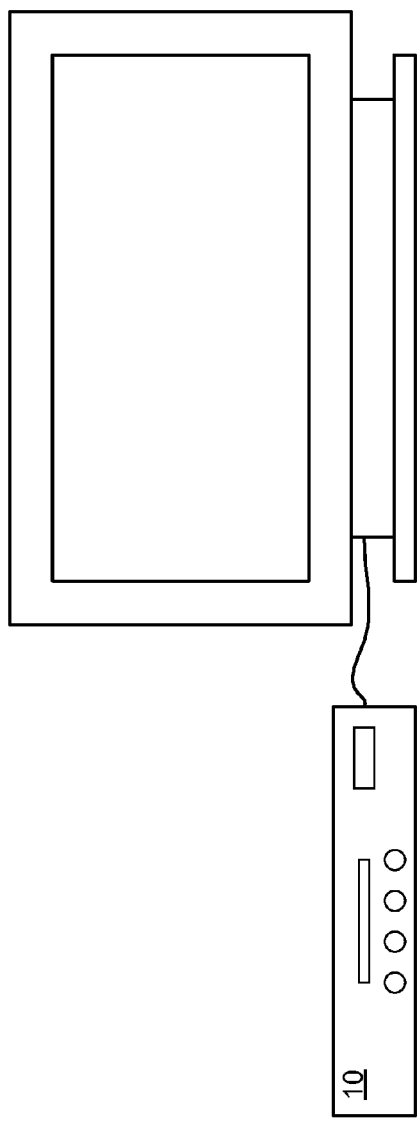
FIGS. 1-3 present pictorial diagram representations of various video devices in accordance with embodiments of the present invention.
Figure 2:
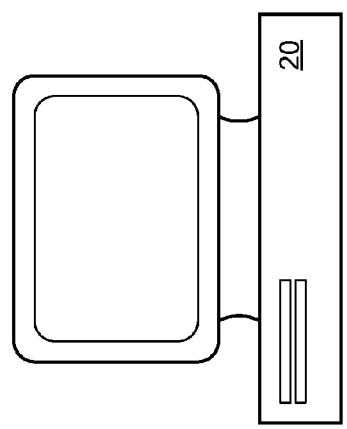
Figure 3:
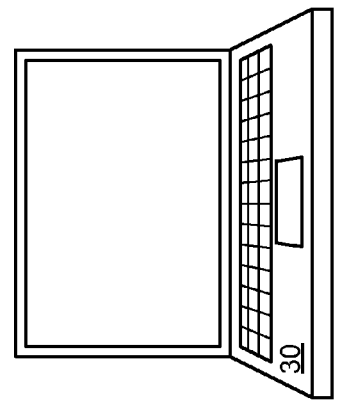

FIGS. 1-3 present pictorial diagram representations of various video devices in accordance with embodiments of the present invention. In particular, set top box 10 with built-in digital video recorder functionality or a stand alone digital video recorder, computer 20 and portable computer 30 illustrate electronic devices that incorporate a video device 125 that includes one or more features or functions of the present invention. While these particular devices are illustrated, video processing device 125 includes any device that is capable of encoding, decoding and/or transcoding video content in accordance with the methods and systems described in conjunction with FIGS. 4-25 and the appended claims.

Figure 4:
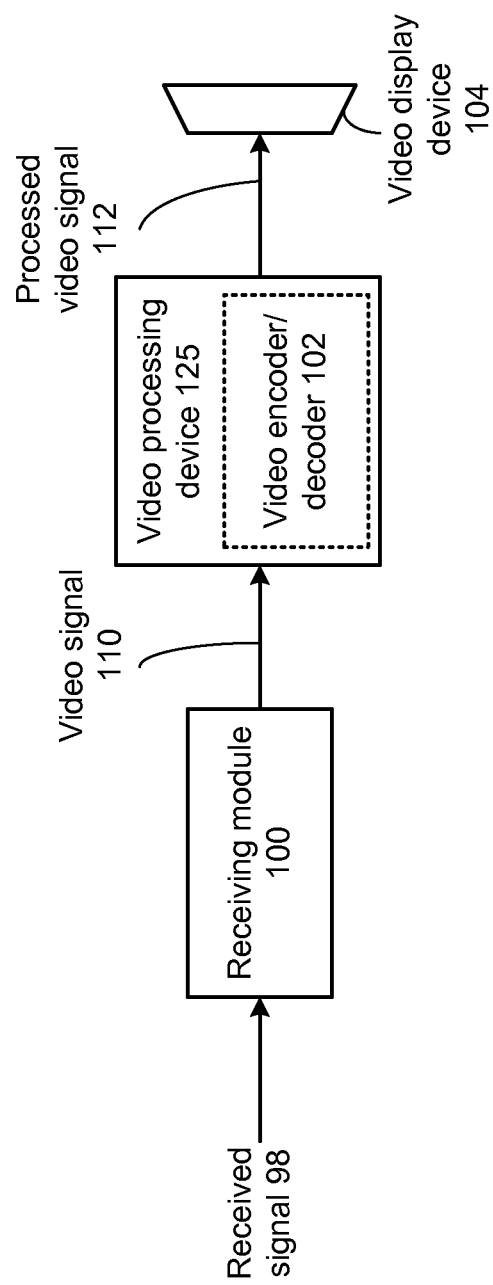
FIG. 4 presents a block diagram representation of a video device in accordance with an embodiment of the present invention.

FIG. 4 presents a block diagram representation of a video device in accordance with an embodiment of the present invention. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), Quicktime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 5:
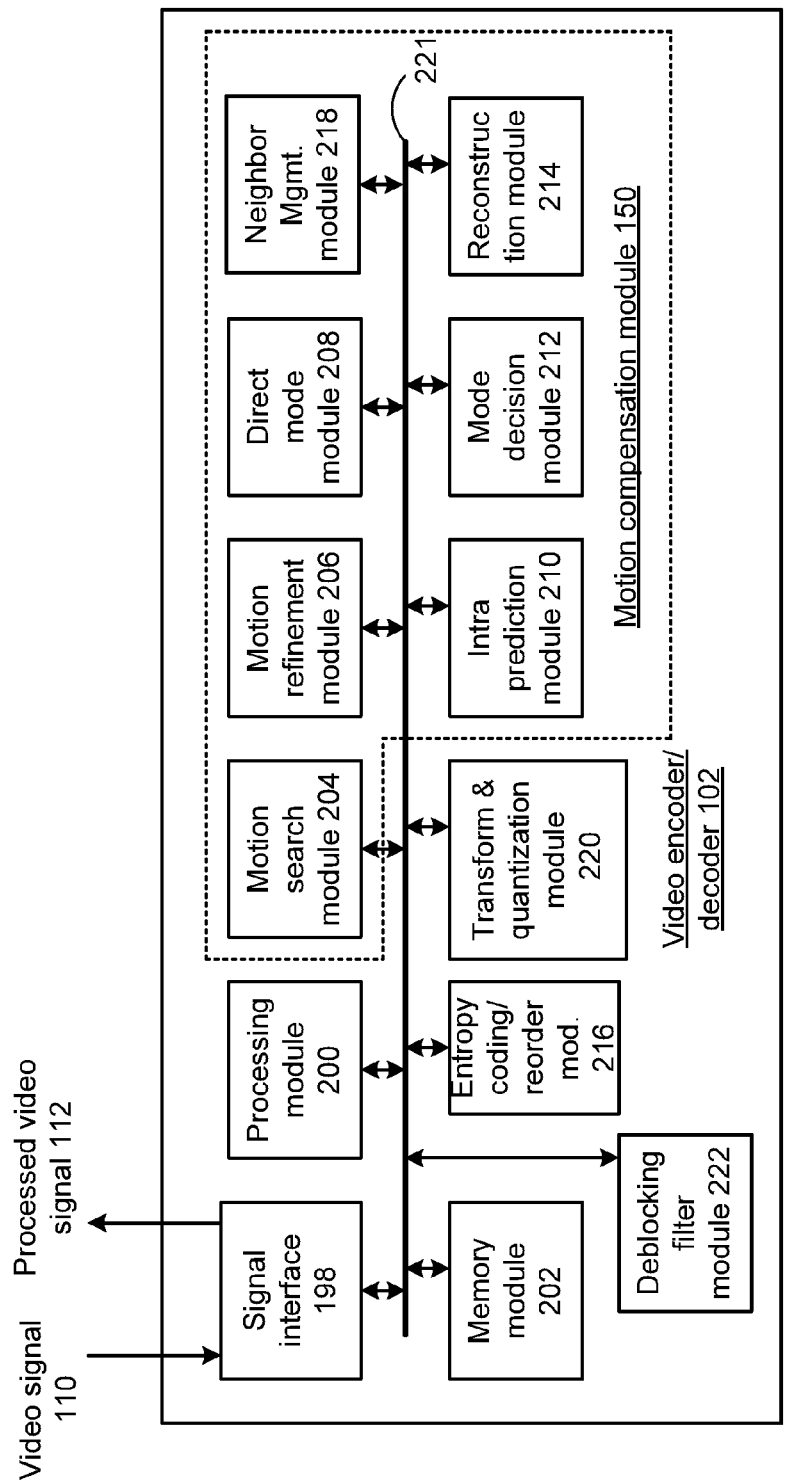
FIG. 5 presents a block diagram representation of a video encoder/decoder 102 in accordance with an embodiment of the present invention.

FIG. 5 presents a block diagram representation of a video encoder/decoder 102 in accordance with an embodiment of the present invention. In particular, video encoder/decoder 102 can be a video codec that operates in accordance with many of the functions and features of the H.264 standard, the MPEG-4 standard, VC-1 (SMPTE standard 421M) or other standard, to process processed video signal 112 to encode, decode or transcode video input signal 110. Video input signal 110 is optionally formatted by signal interface 198 for encoding, decoding or transcoding.

The video encoder/decoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220 and deblocking filter module 222. The modules of video encoder/decoder 102 can be implemented in software or firmware and be structured as operations performed by processing module 200. Alternatively, one or more of these modules can be implemented using a hardware engine that includes a state machine, analog circuitry, digital circuitry, and/or logic circuitry, and that operates either independently or under the control and/or direction of processing module 200 or one or more of the other modules, depending on the particular implementation. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present invention, the operation of the encoding mode utilizes a plurality of modules that each perform a specific encoding function. The operation of decoding also utilizes at least one of these plurality of modules to perform a similar function in decoding. In this fashion, modules such as the motion refinement module 206 and more particularly an interpolation filter used therein, and intra-prediction module 210, can be used in both the encoding and decoding process to save on architectural real estate when video encoder/decoder 102 is implemented on an integrated circuit or to achieve other efficiencies. In addition, some or all of the components of the direct mode module 208, mode decision module 212, reconstruction module 214, transformation and quantization module 220, deblocking filter module 222 or other function specific modules can be used in both the encoding and decoding process for similar purposes.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 10) that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion search module 204 is able to operate on a macroblock to contemporaneously determine the motion search motion vector for each subblock of the macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110, a refined motion vector that represents the displacement of the macroblock from a reference frame or reference field of the video signal to a current frame or field.

Based on the pixels and interpolated pixels, the motion refinement module 206 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the a sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the right of the current macroblock and on motion vectors from neighboring current macroblocks of a prior row of the video input signal or an estimated predicted motion vector that is determined based on motion vectors from neighboring current macroblocks of a prior row of the video input signal. In an embodiment of the present invention, the cost calculation avoids the use of neighboring subblocks within the current macroblock. In this fashion, motion refinement module 206 is able to operate on a macroblock to contemporaneously determine the motion search motion vector for each subblock of the macroblock.

When estimated predicted motion vectors are used, the cost formulation avoids the use of motion vectors from the current row and both the motion search module 204 and the motion refinement module 206 can operate in parallel on an entire row of video input signal 110, to contemporaneously determine the refined motion vector for each macroblock in the row.

A direct mode module 208 generates a direct mode motion vector for each macroblock, based on macroblocks that neighbor the macroblock. In an embodiment of the present invention, the direct mode module 208 operates to determine the direct mode motion vector and the cost associated with the direct mode motion vector based on the cost for candidate direct mode motion vectors for the B slices of video input signal 110, such as in a fashion defined by the H.264 standard.

While the prior modules have focused on inter-prediction of the motion vector, intra-prediction module 210 generates a best intra prediction mode for each macroblock of the plurality of macroblocks. In an embodiment of the present invention, intra-prediction module 210 operates as defined by the H.264 standard, however, other intra-prediction techniques can likewise be employed. In particular, intra-prediction module 210 operates to evaluate a plurality of intra prediction modes such as a Intra-4×4 or Intra-16×16, which are luma prediction modes, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entropy coding module 216, filtered by de-blocking filter module 222. In an embodiment of the present invention, further formatting and/or buffering can optionally be performed by signal interface 198 and the processed video signal 112 can be represented as being output therefrom.

As discussed above, many of the modules of motion compensation module 150 operate based on motion vectors determined for neighboring macroblocks. Neighbor management module 218 generates and stores neighbor data for at least one macroblock of the plurality of macroblocks for retrieval by at least one of the motion search module 204, the motion refinement module 206, the direct mode module 208, intra-prediction module 210, entropy coding module 216 and deblocking filter module 222, when operating on at least one neighboring macroblock of the plurality of macroblocks. In an embodiment of the present invention, a data structure, such as a linked list, array or one or more registers are used to associate and store neighbor data for each macroblock in a buffer, cache, shared memory or other memory structure. Neighbor data includes motion vectors, reference indices, quantization parameters, coded-block patterns, macroblock types, intra/inter prediction module types neighboring pixel values and or other data from neighboring macroblocks and/or subblocks used to by one or more of the modules or procedures of the present invention to calculate results for a current macroblock. For example, in order to determine the predicated motion vector for the motion search module 204 and motion refinement module 206, both the motion vectors and reference index of neighbors are required. In addition to these data, the direct mode module 208 requires the motion vectors of the co-located macroblock of previous reference pictures. The deblocking filter module 222 operates according to a set of filtering strengths determined by using the neighbors' motion vectors, quantization parameters, reference index, and coded-block-patterns, etc. For entropy coding in entropy coding module 216, the motion vector differences (MVD), macroblock types, quantization parameter delta, inter predication type, etc. are required.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor subblocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start not until the location of the four neighbors has been determined and their data have been fetched from memory.

In an embodiment of the present invention, when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pinpointing neighbors is virtually re-allocated to its preceding macroblocks. The encoding of macroblocks can be therefore be more streamline and faster. In other words, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB (x,y−1), MB (x+1,y−1) and MB(x−1,y) neighbor data is stored for each neighboring macroblock corresponding to each of these macroblocks that are yet to be processed, including MB(x,y). In this fashion, when MB(x,y) is ready to be processed, the neighbor data is already stored in a data structure that corresponds to this macroblock for fast retrieval.

The motion compensation can then proceed using the retrieved data. In particular, the motion search module 204 and/or the motion refinement module, can generate at least one predicted motion vector (such as a standard PMV or estimated predicted motion vector) for each macroblock of the plurality of macroblocks using retrieved neighbor data. Further, the direct mode module 208 can generate at least one direct mode motion vector for each macroblock of the plurality of macroblocks using retrieved neighbor data and the intra-prediction module 210 can generate the best intra prediction mode for each macroblock of the plurality of macroblocks using retrieved neighbor data, and the coding module 216 can use retrieved neighbor data in entropy coding, each as set forth in the H.264 standard, the MPEG-4 standard, VC-1 (SMPTE standard 421M) or by other standard or other means.

While not expressly shown, video encoder/decoder 102 can include a memory cache, shared memory, a memory management module, a comb filter or other video filter, and/or other module to support the encoding of video input signal 110 into processed video signal 112.

Further details of specific encoding and decoding processes will be described in greater detail in conjunction with FIGS. 6 and 7.

Figure 6:
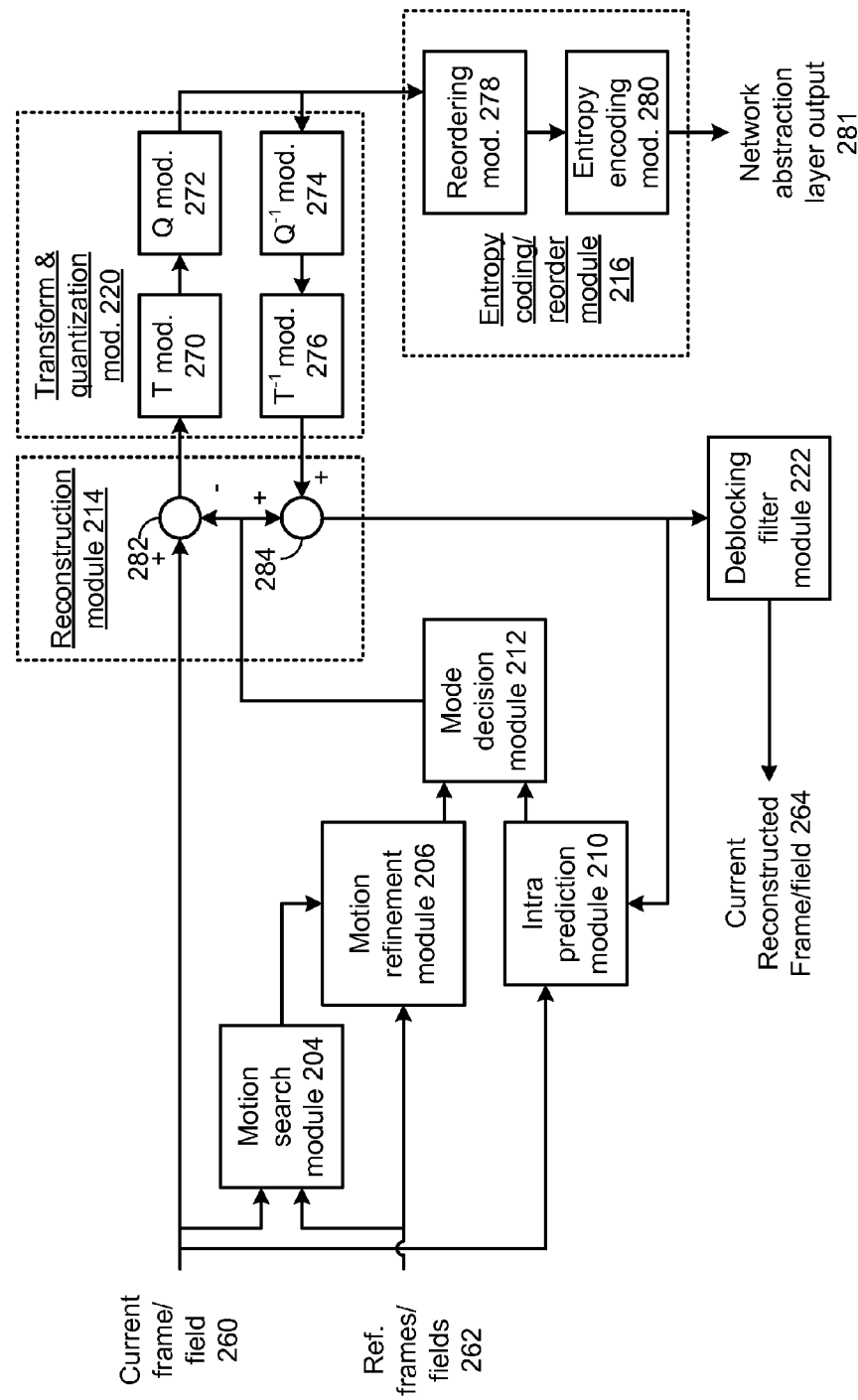
FIG. 6 presents a block flow diagram of a video encoding operation in accordance with an embodiment of the present invention.

FIG. 6 presents a block flow diagram of a video encoding operation in accordance with an embodiment of the present invention. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. It should also be noted that current reconstructed frames/fields 264 can be buffered to generate reference frames/fields 262 for future current frames/fields 260.

As discussed in conjunction with FIG. 5, one or more of the modules of video encoder/decoder 102 can also be used in the decoding process as will be described further in conjunction with FIG. 7.

Figure 7:
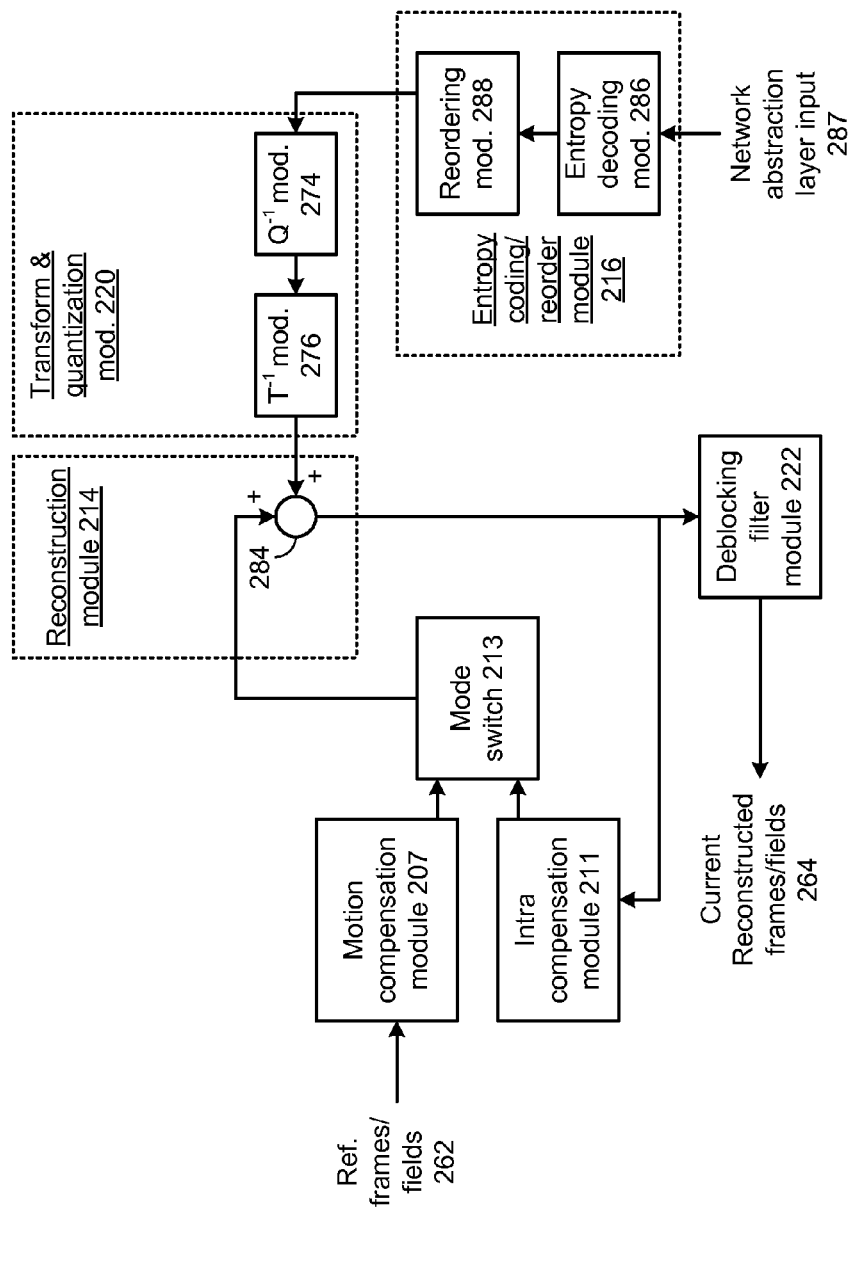
FIG. 7 presents a block flow diagram of a video decoding operation in accordance with an embodiment of the present invention.

FIG. 7 presents a block flow diagram of a video decoding operation in accordance with an embodiment of the present invention. In particular, this video decoding operation contains many common elements described in conjunction with FIG. 6 that are referred to by common reference numerals. In this case, the motion compensation module 207, the intra-compensation module 211, the mode switch 213, process reference frames/fields 262 to generate current reconstructed frames/fields 264. In addition, the reconstruction module 214 reuses the adding circuit 284 and the transform and quantization module reuses the inverse transform module 276 and the inverse quantization module 274. In should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 6 and 7, the present invention can likewise be similarly employed to the other embodiments of the present invention described in conjunction with FIGS. 1-5 and 8-25 and/or with other function specific modules used in conjunction with video encoding and decoding.

Figure 8:
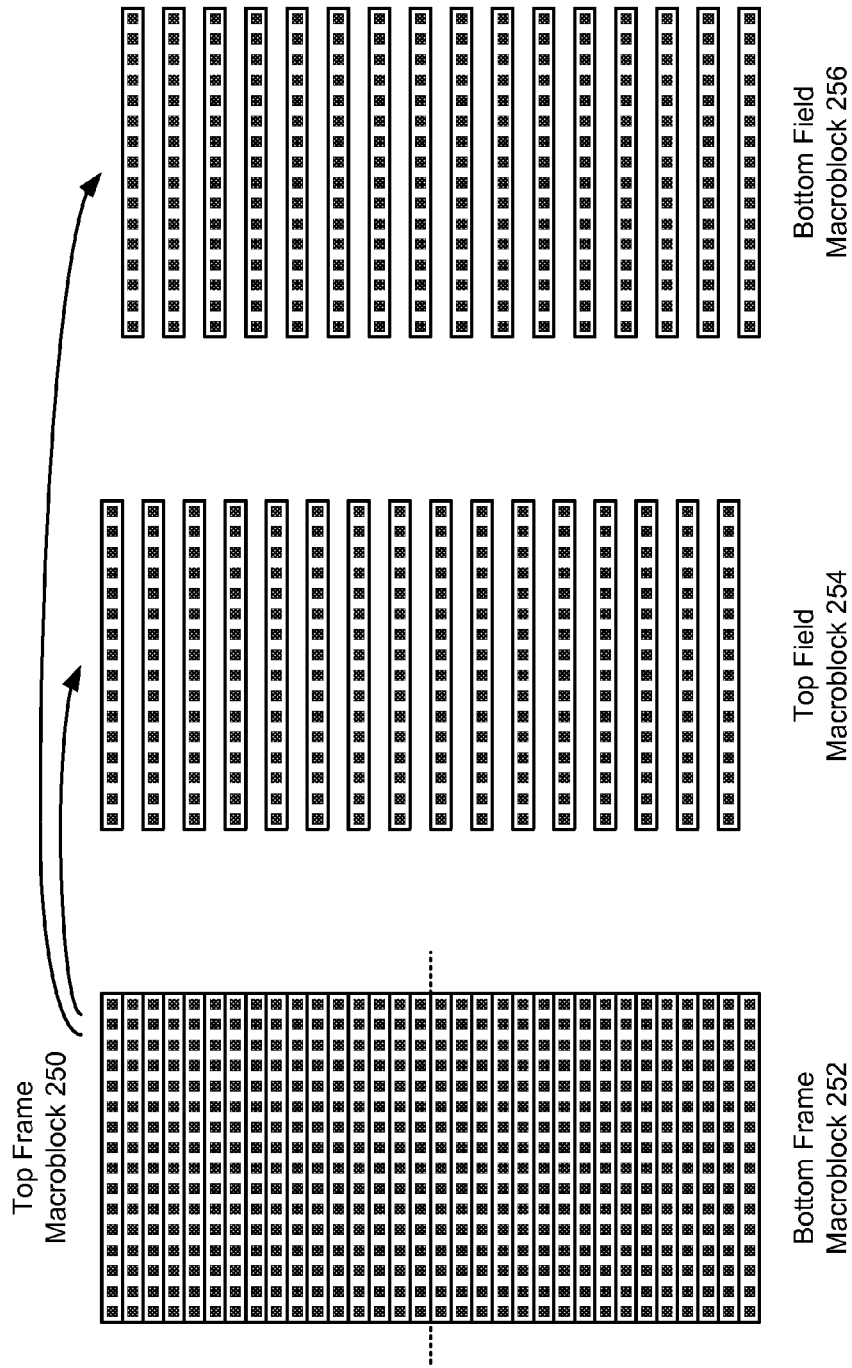
FIG. 8 presents a graphical representation of the relationship between example top frame and bottom frame macroblocks (250, 252) and example top field and bottom field macroblocks (254, 256) in accordance with an embodiment of the present invention.

FIG. 8 presents a graphical representation of the relationship between exemplary top frame and bottom frame macroblocks (250, 252) and exemplary top field and bottom field macroblocks (254, 256). Video encoder/decoder 102 can operate on macroblock data that corresponds to such a macroblock pair in either frame or field mode, that includes top frame macroblock 250, bottom frame macroblock 252 or top field macroblock 254 and bottom field macroblock 256. In addition, neighbor data from the macroblock pair above the current macroblock stored in the conjunction with the processing of the prior macroblocks (when the neighbor above was the current macroblock), whether the macroblocks themselves were processed in frame or in field mode, and can be accessed in the processing of the macroblock of interest by retrieval directly from memory, with or without a look-up table and without further processing.

Figure 9:
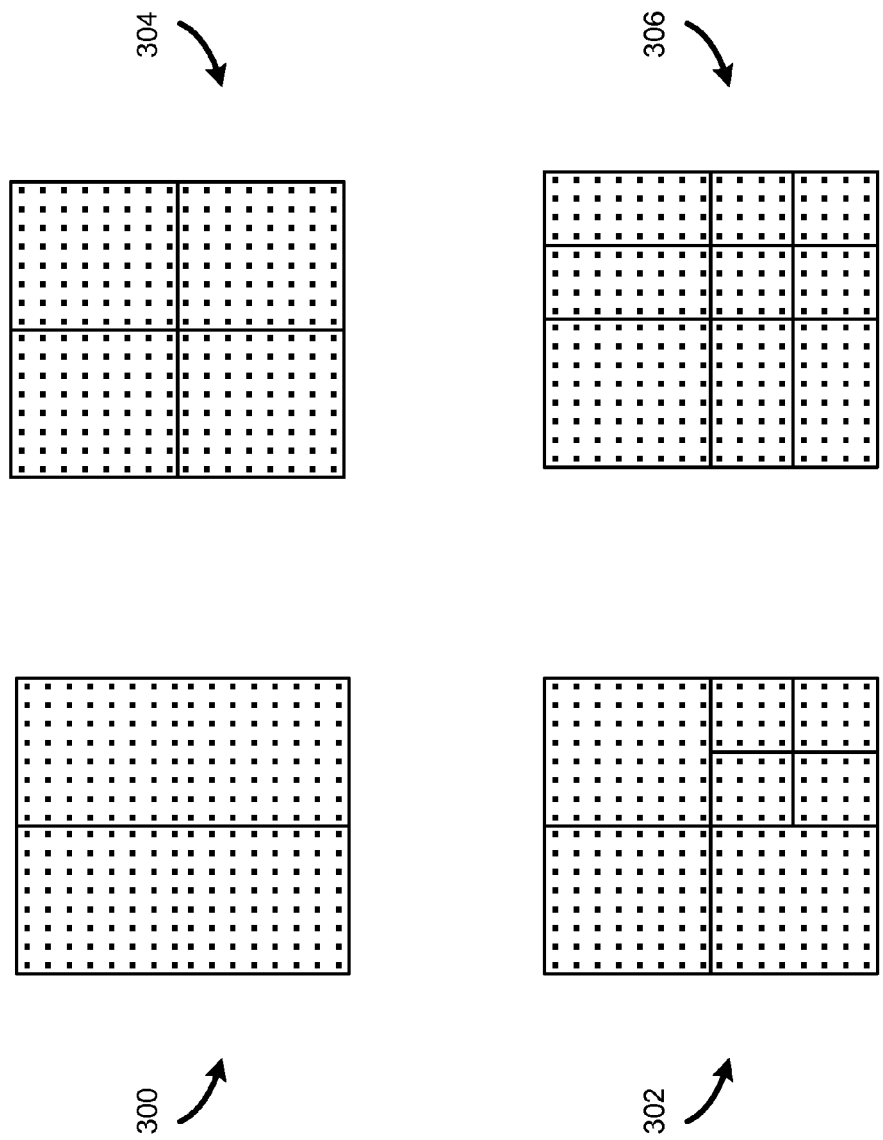
FIG. 9 presents a graphical representation that shows example macroblock partitioning in accordance with an embodiment of the present invention.

FIG. 9 presents a graphical representation of exemplary partitionings of a macroblock of a video input signal into subblocks. While the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side. The subblocks can be dealt with in the same way as macroblocks. For example, motion search module 204 can generate separate motion search motion vectors for each subblock of each macroblock, etc.

Macroblock 300, 302, 304 and 306 represent examples of partitioning into subblocks in accordance with the H.264 standard. Macroblock 300 is a 16×16 macroblock that is partitioned into two 8×16 subblocks. Macroblock 302 is a 16×16 macroblock that is partitioned into three 8×8 subblocks and four 4×4 subblocks. Macroblock 304 is a 16×16 macroblock that is partitioned into four 8×8 subblocks. Macroblock 306 is a 16×16 macroblock that is partitioned into an 8×8 subblock, two 4×8 subblocks, two 8×4 subblocks, and four 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of partitions of a particular macroblock. The result however can yield more accurate motion compensation and reduced compression artifacts in the decoded video image.

Figure 10:
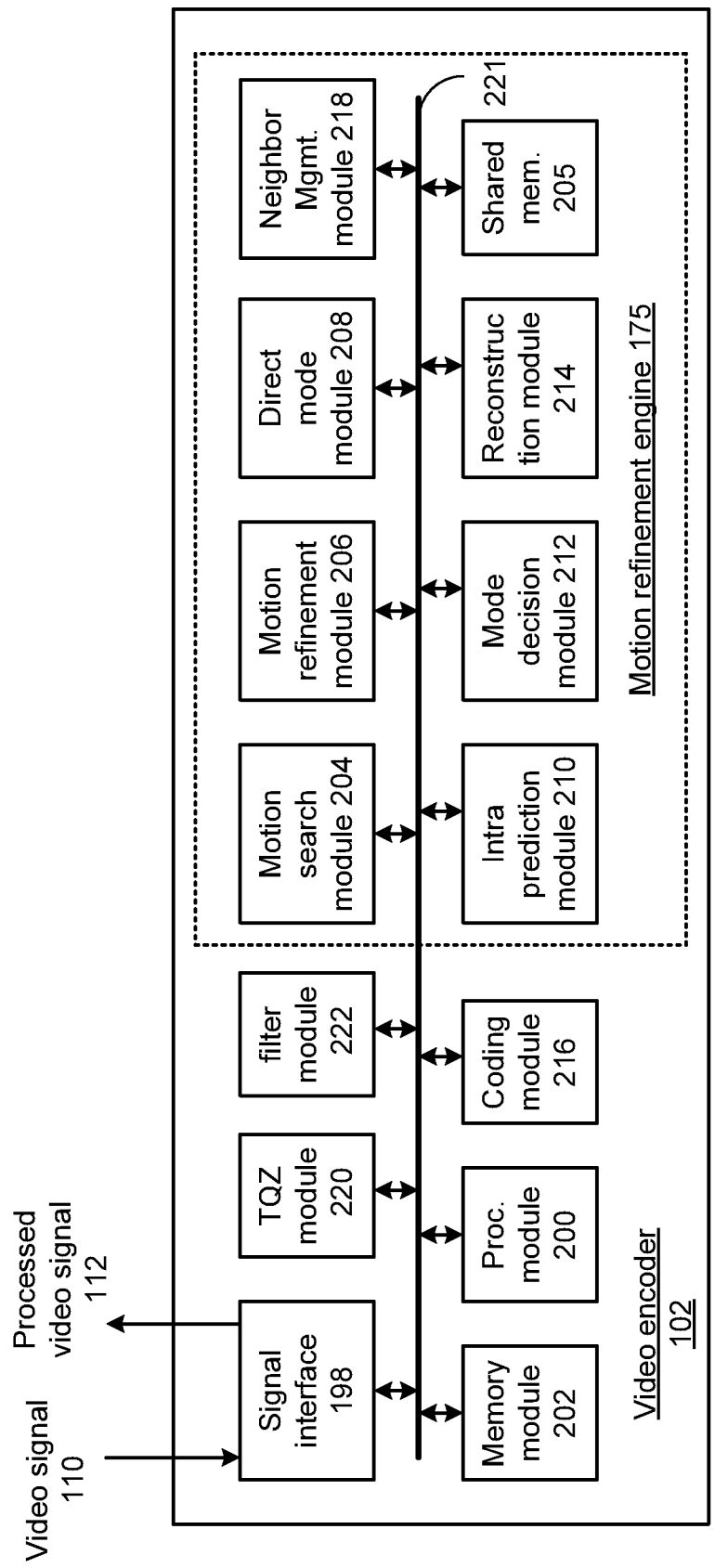
FIG. 10 presents a block diagram representation of a video encoder/decoder 102 that includes motion refinement engine 175 in accordance with an embodiment of the present invention.

FIG. 10 presents a block diagram representation of a video encoder/decoder 102 that includes motion refinement engine 175 in accordance with an embodiment of the present invention. In addition to modules referred to by common reference numerals used to refer to corresponding modules of previously described embodiments, motion refinement engine 175 includes a shared memory 205 that can be implemented separately from, or part of, memory module 202. In addition, motion refinement engine 175 can be implemented in a special purpose hardware configuration that has a generic design capable of handling sub-pixel search using different reference pictures—either frame or field and either forward in time, backward in time or a blend between forward and backward. Motion refinement engine 175 can operate in a plurality of compression modes to support a plurality of different compression algorithms such as H.264, MPEG-4, VC-1, etc. in an optimized and single framework. Reconstruction can be performed for chroma only, luma only or both chroma and luma.

For example, the capabilities of these compression modes can include:

H.264:
1. Motion search and refinement on all large partitions into subblocks of size (16×16), (16×8), (8×16) and (8×8) for forward/backward and blended directions when MBAFF is ON. This also includes field and frame MB types.
2. Motion search and refinement on all partitions into subblocks of size (16×16), (16×8), (8×16) and (8×8), and subpartitions into subblocks of size (8×8), (8×4), (4×8), and (4×4) for forward/backward and blended directions when MBAFF is OFF.
3. Computation of direct mode and/or skip mode cost for MBAFF ON and OFF.
4. Mode decision is based on all the above partitions for MBAFF ON and OFF. The chroma reconstruction for the corresponding partitions is implicitly performed when the luma motion reconstruction is invoked.
5. Motion refinement and compensation include quarter pixel accurate final motion vectors using the 6 tap filter algorithms of the H.264 standard.

VC-1:
1. Motion search and refinement for both 16×16 and 8×8 partitions for both field and frame cases for forward, backward and blended directions.
2. Mode decision is based on each of the partitions above. This involves the luma and corresponding chroma reconstruction.
3. Motion refinement and compensation include bilinear half pixel accurate final motion vectors of the VC-1 standard.

MPEG-4:
1. Motion search and refinement for both 16×16 and 8×8 partitions for both field and frame cases for forward, backward and blended directions.
2. Mode decision is based on all of the partitions above. Reconstruction involves the luma only.
3. Motion refinement and compensation include bilinear half pixel accurate MVs of the VC-1 standard.

Further, motion refinement engine 175 can operate in two basic modes of operation (1) where the operations of motion refinement module 206 are triggered by and/or directed by software/firmware algorithms included in memory module 202 and executed by processing module 200; and (2) where operations of motion refinement module 206 are triggered by the motion search module 204, with little or no software/firmware intervention. The first mode operates in accordance with one or more standards, possibly modified as described herein. The second mode of operation can be dynamically controlled and executed more quickly, in an automated fashion and without a loss of quality.

Shared memory 205 can be individually, independently and contemporaneously accessed by motion search module 204 and motion refinement module 206 to facilitate either the first or second mode of operation. In particular, shared memory 205 includes a portion of memory, such as a cost table that stores results (such as motion vectors and costs) that result from the computations performed by motion search module 204. This cost table can include a plurality of fixed locations in shared memory where these computations are stored for later retrieval by motion refinement module 206, particularly for use in the second mode of operation. In addition, to the cost table, the shared memory 205 can also store additional information, such as a hint table, that tells the motion refinement module 206 and the firmware of the decisions it makes for use in either mode, again based on the computations performed by motion search module 204. Examples include: identifying which partitions are good, others that are not as good and/or can be discarded; identifying either frame mode or field mode as being better and by how much; and identifying which direction, amongst forward, backward and blended is good and by how much, etc.

The motion search module may terminate its computations early based on the results it obtains. In any case, motion search can trigger the beginning of motion refinement directly by a trigger signal sent from the motion search module 204 to the motion refinement module 206. Motion refinement module 206 can, based on the data stored in the hint table and/or the cost table, have the option to refine only particular partitions, a particular mode (frame or field), and/or a particular direction (forward, backward or blended) that either the motion search module 204 or the motion refinement module 206 determines to be good based on a cost threshold or other performance criteria. In the alternative, the motion refinement module can proceed directly based on software/firmware algorithms in a more uniform approach. In this fashion, motion refinement engine 175 can dynamically and selectively operate so as to complete the motion search and motion refinement, pipelined and in parallel, such that the refinement is performed for selected partitions, all the subblocks for a single partition, group of partitions or an entire MB/MB pair on both a frame and field basis, on only frame or field mode basis, and for forward, backward and blended directions of for only a particular direction, based on the computations performed by the motion search module 204.

In operation, motion search module 204 contemporaneously generates a motion search motion vector for a plurality of subblocks for a plurality of partitionings of a macroblock of a plurality of MB/MB pairs. Motion refinement module 206, when enabled, contemporaneously generates a refined motion vector for the plurality of subblocks for the plurality of partitionings of the MB/MB pairs of the plurality of macroblocks, based on the motion search motion vector for each of the plurality of subblocks of the macroblock of the plurality of macroblocks. Mode decision module selects a selected partitioning of the plurality of partitionings, based on costs associated with the refined motion vector for each of the plurality of subblocks of the plurality of partitionings, of the macroblock of the plurality of macroblocks, and determines a final motion vector for each of the plurality of subblocks corresponding to the selected partitioning of the macroblock of the plurality of macroblocks. Reconstruction module 214 generates residual pixel values, for chroma and/or luma, corresponding to a final motion vector for the plurality of subblocks of the macroblock of the plurality of macroblocks.

Further, the motion search module 204 and the motion refinement module 206 can operate in a plurality of other selected modes including modes corresponding to different compression standards, and wherein the plurality of partitionings can be based on the selected mode. For instance, in one mode, the motion search module 204 and the motion refinement module 206 are capable of operating with macroblock adaptive frame and field (MBAFF) enabled when a MBAFF signal is asserted and with MBAFF disabled when the MBAFF enable signal is deasserted, and wherein the plurality of partitionings are based on the MBAFF enable signal. In an embodiment, when the MBAFF signal is asserted, the plurality of partitionings of the macroblock partition the macroblock into subblocks having a first minimum dimension of sizes 16 pixels by 16 pixels, 16 pixels by 8 pixels, 8 pixels by 16 pixels, and 8 pixels by 8 pixels—having a minimum dimension of 8 pixels. Further, when the MBAFF signal is deasserted, the plurality of partitionings of the macroblock partition the macroblock into subblocks having a second minimum dimension of sizes 16 pixels by 16 pixels, 16 pixels by 8 pixels, 8 pixels by 16 pixels, 8 pixels by 8 pixels, 4 pixels by 8 pixels, 8 pixels by 4 pixels, and 4 pixels by 4 pixels—having a minimum dimension of 4 pixels. In other modes of operation, the plurality of partitionings of the macroblock partition the macroblock into subblocks of sizes 16 pixels by 16 pixels, and 8 pixels by 8 pixels. While particular macroblock dimensions are described above, other dimensions are likewise possible with the scope of the present invention.

In addition to the partitionings of the MB/MB pairs being based on the particular compression standard employed, motion search module 204 can generate a motion search motion vector for a plurality of subblocks for a plurality of partitionings of a macroblock of a plurality of macroblocks and generate a selected group of the plurality of partitionings based on a group selection signal. Further, motion refinement module 206 can generate the refined motion vector for the plurality of subblocks for the selected group of the plurality of partitionings of the macroblock of the plurality of macroblocks, based on the motion search motion vector for each of the plurality of subblocks of the macroblock of the plurality of macroblocks. In this embodiment, the group selection signal can be used by the motion search module 204 to selectively apply one or more thresholds to narrow down the number of partitions considered by motion refinement module 206 in order to speed up the algorithm.

For example, when the group selection signal has a first value, the motion search module 204 determines the selected group of the plurality of partitionings by comparing, for the plurality of partitionings of the macroblock of the plurality of macroblocks, the accumulated costs associated with the motion search motion vector for each of the plurality of subblocks with a first threshold, and assigning the selected group to be a partitioning with the accumulated cost that compares favorably to the first threshold. In this mode, if a particular partitioning is found that generates a very good cost, the motion search module 204 can terminate early for the particular macroblock and motion refinement module 206 can operate, not on the entire set of partitionings, but on the particular partitioning that generates a cost that compares favorably to the first threshold.

Further, when the group selection signal has a second value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks and assigning the selected group to be the selected partitioning with the most favorable accumulated cost. Again, motion refinement module 206 can operate, not on the entire set of partitionings, but on the particular partitioning that generates the most favorable cost from the motion search.

In addition, when the group selection signal has a third value, the motion search module 204 determines the selected group of the plurality of partitionings by comparing, for the plurality of partitionings of the macroblock of the plurality of macroblocks, the accumulated the costs associated with the motion search motion vector for each of the plurality of subblocks with a second threshold, and assigning the selected group to be each of partitionings of the plurality of partitionings with accumulated cost that compares favorably to the second threshold. In this mode, motion refinement module 206 can operate, not on the entire set of partitionings, but only on those partitionings that generate a cost that compares favorably to the second threshold.

As discussed above, the motion search module 204 and motion refinement module 206 can be pipelined and operate to contemporaneously generate the motion search motion vector for the plurality of subblocks for a plurality of partitionings of a macroblock of a plurality of macroblocks, in parallel. In addition, shared memory 205 can be closely coupled to both motion search module 204 and motion refinement module 206 to efficiently store the results for selected group of partitionings from the motion search module 204 for use by the motion refinement module 206. In particular, motion search module 204 stores the selected group of partitionings and the corresponding motion search motion vectors in the shared memory and other results in the cost and hint tables. Motion refinement module 206 retrieves the selected group of partitionings and the corresponding motion search motion vectors from the shared memory. In a particular embodiment, the motion search module 204 can generate a trigger signal in response to the storage of the selected group of partitionings of the macroblock and the corresponding motion search motion vectors and/or other results in the shared memory, and the motion refinement module 206 can commence the retrieval of the selected group of partitionings and the corresponding motion search motion vectors and/or other results from the shared memory in response to the trigger signal.

As discussed above, the motion refinement for a particular macroblock can be turned off by selectively disabling the motion refinement module for a particular application, compression standard, or a macroblock. For instance, a skip mode can be determines when the cost associated with the stationary motion vector compares favorably to a skip mode cost threshold or if the total cost associated with a particular partitioning compares favorably to a skip refinement cost threshold. In this skip mode, the motion search motion vector can be used in place of the refined motion vector. In yet another optional feature, the motion search module 204 generates a motion search motion vector for a plurality of subblocks for a plurality of partitionings of a macroblock of a plurality of macroblocks based one or several costs calculations such as on a sum of accumulated differences (SAD) cost, as previously discussed. However, motion refinement module 206, when enabled, generates a refined motion vector for the plurality of subblocks for the plurality of partitionings of the macroblock of the plurality of macroblocks, based on the motion search motion vector for each of the plurality of subblocks of the macroblock of the plurality of macroblocks based on a sum of accumulated transform differences (SATD) cost. In this case, the mode decision module 212 must operate on either SAD costs from the motion search module 204 or SATD costs from the motion refinement module 206.

Mode decision module 212 is coupled to the motion refinement module 206 and the motion search module 204. When the motion refinement module 206 is enabled for a macroblock, the mode decision module 212 selects a selected partitioning of the plurality of partitionings, based on SATD costs associated with the refined motion vector for each subblocks of the plurality of partitionings of the macroblock. In addition, when the motion refinement module 206 is disabled for the macroblock of the plurality of macroblocks, mode decision module 212 selects a selected partitioning of the plurality of partitionings, based on SAD costs associated with the motion search motion vector for each subblocks of the plurality of partitionings of the macroblock, and that determines a final motion vector for each subblocks corresponding to the selected partitioning of the macroblock.

Since the motion refinement engine 175 can operate in both a frame or field mode, mode decision module 212 selects one of a frame mode and a field mode for the macroblock, based on SATD costs associated with the refined motion vector for each subblocks of the plurality of partitionings of the macroblock, or based on SAD costs associated with the motion search motion vector for each subblocks of the plurality of partitionings of the macroblock.

In an embodiment of the present invention, the motion refinement engine 175 is designed to work through a command FIFO located in the shared memory 205. The functional flexibilities of the engine are made possible with a highly flexible design of the command FIFO. The command FIFO has four 32-bit registers, of which one of them is the trigger for the motion refinement engine 175. It could be programmed so as to complete the motion refinement/compensation for a single partition, group of partitions or an entire MB/MB pair, with or without MBAFF, for forward, backward and blended directions with equal ease. It should be noted that several bits are reserved to support future features of the present invention.

In a particular embodiment, the structure of the command FIFO is as summarized in the table below.

| Field Name | Bit Position | Description |
| --- | --- | --- |
| TASK | 1:0 | 0 = Search/refine<br>1 = Direct<br>2 = Motion Compensation/Reconstruction<br>3 = Decode |
| DIRECTION | 4:2 | Bit 0: FWD<br>Bit 1: BWD<br>Bit 2: Blended |
| WRITE_COST | 5 | 0 = Don't write out Cost<br>1 = Write out Cost |
| PARTITIONS | 51:6 | Which partitions to turn on and off. This is interpreted in accordance with a MBAFF Flag |
| TAG | 58:52 | To tag the Index FIFO entry- 7 bits |
| DONE | 59 | Generate Interrupt when finished this entry |
| PRED_DIFF_INDEX | 63:60 | Which Predicted and Difference Index to write to |
| CURR_Y_MB_INDEX | 67:64 | Which Current Y MB Index to read from |
| CURR_C_MB_INDEX | 71:68 | Which Current C MB Index to read from |
| FWD_INDEX | 75:72 | FWD Command Table Index to parse through |
| BWD_INDEX | 79:76 | BWD Command Table Index to parse through |
| BLEND_INDEX | 83:80 | BLEND Command Table Index to write to |
| Reserved | 84 | |
| THRESHOLD_ENABLE | 85 | Perform Refinement only for the partitions indicated by the threshold table. |
| BEST_MB_PARTITION | 86 | Use only the Best Macroblock partition. This will ignore the PARTITIONS field in this index FIFO entry |
| Reserved | 87 | |
| DIRECT_TOP_FRM_FLD_SEL | 89:88 | 00: None, 01: Frame, 10: Field, 11: Both |
| DIRECT_BOT_FRM_FLD_SEL | 91:90 | 00: None, 01: Frame, 10: Field, 11: Both |
| WRITE_PRED_PIXELS | 93:92 | 0 = Don't write out Predicted Pixels<br>1 = Write out Top MB Predicted Pixels<br>2 = Write out Bottom MB Predicted Pixels<br>3 = Write out both Top and Bottom MB Predicted Pixels (turned on for the last entry of motion compensation) |
| WRITE_DIFF_PIXELS | 95:94 | 0 = Don't Write out Difference Pixels<br>1 = Write out Top MB Difference Pixels<br>2 = Write out Bottom MB Difference Pixels<br>3 = Write out both Top and Bottom MB Predicted Pixels (Note: In Motion Compensation Mode, this will write out the Motion Compensation Pixels and will be turned on for the last entry of motion compensation) |
| CURR_MB_X | 102:96 | Current X coordinate of Macroblock |
| Reserved | 103 | |
| CURR_MB_Y | 110:104 | Current Y coordinate of Macroblock |
| Reserved | 111 | |
| LAMBDA | 118:112 | Portion of weighted for cost |
| Reserved | 121:119 | |
| BWD_REF_INDEX | 124:122 | Backward Reference Index |
| FWD_REF_INDEX | 127:125 | Forward Reference Index |

In addition to the Command FIFO, there are also some slice level registers in the shared memory that the motion refinement engine 175 uses. These include common video information like codec used, picture width, picture height, slice type, MBAFF Flag, SATD/SAD flag and the like. By appropriately programming the above bits, the following flexibilities/scenarios could be addressed:

1. The task bits define the operation to be performed by the motion refinement engine 175. By appropriately combining this with the codec information in the registers, the motion refinement engine 175 can perform any of the above tasks for all the codecs as listed earlier.
2. The direction bits refer to the reference picture that needs to be used and are particularly useful in coding B Slices. Any combination of these 3 bits could be set for any of the tasks. By enabling all these 3 bits for refinement, the motion refinement engine 175 can complete motion refinement for the entire MB in all three directions in one call. However, the motion refinement engine 175 can also could select any particular direction and perform refinement only for that (as might be required in P slices). The command FIFO, thus offers the flexibility to address both cases of a single, all-directions call or multiple one-direction calls.
3. The partitions bits are very flexible in their design as they holistically cater to motion refinement and reconstruction for all partitions and sub partitions. By effectively combining these bits with the direction bits, the motion refinement engine 175 can achieve both the extremes i.e. perform refinement for all partitions for all the directions in one shot or perform refinement/compensation for a select set of partitions in a particular direction. The partition bits are also dynamically interpreted differently by the motion refinement engine 175 engine based on the MBAFF ON flag in the registers. Thus, using an optimized, limited set of bits, the motion refinement engine 175 can address an exhaustive scenario of partition combinations. The structure of the partition bits for each of these modes is summarized in the tables that follow for frame (FRM), field (FLD) and direct mode (DIRECT) results.

MBAFF ON:

| Macroblock | Partition | Frm/Fld | Bit |
|---|---|---|---|
| TOP MB | 16 × 16 | FRM | 0 |
| | | FLD | 1 |
| | | DIRECT | 2 |
| | 16 × 8 Top Partition | FRM | 3 |
| | | FLD | 4 |
| | 16 × 8 Bottom Partition | FRM | 5 |
| | | FLD | 6 |
| | 8 × 16 Left Partition | FRM | 7 |
| | | FLD | 8 |
| | 8 × 16 Right Partition | FRM | 9 |
| | | FLD | 10 |
| | 8 × 8 Top Left Partition | FRM | 11 |
| | | FLD | 12 |
| | | DIRECT | 13 |
| | 8 × 8 Top Right Partition | FRM | 14 |
| | | FLD | 15 |
| | | DIRECT | 16 |
| | 8 × 8 Bottom Left Partition | FRM | 17 |
| | | FLD | 18 |
| | | DIRECT | 19 |
| | 8 × 8 Bottom Right Partition | FRM | 20 |
| | | FLD | 21 |
| | | DIRECT | 22 |
| BOT MB | 16 × 16 | FRM | 23 |
| | | FLD | 24 |
| | | DIRECT | 25 |
| | 16 × 8 Top Partition | FRM | 26 |
| | | FLD | 27 |
| | 16 × 8 Bottom Partition | FRM | 28 |
| | | FLD | 29 |
| | 8 × 16 Left Partition | FRM | 30 |
| | | FLD | 31 |
| | 8 × 16 Right Partition | FRM | 32 |
| | | FLD | 33 |
| | 8 × 8 Top Left Partition | FRM | 34 |
| | | FLD | 35 |
| | | DIRECT | 36 |
| | 8 × 8 Top Right Partition | FRM | 37 |
| | | FLD | 38 |
| | | DIRECT | 39 |
| | 8 × 8 Bottom Left Partition | FRM | 40 |
| | | FLD | 41 |
| | | DIRECT | 42 |
| | 8 × 8 Bottom Right Partition | FRM | 43 |
| | | FLD | 44 |
| | | DIRECT | 45 |

MBAFF OFF:

| | Partition | | Bit |
|---|---|---|---|
| FRAME | 16 × 16 | Enable | 0 |
| | | DIRECT | 1 |
| | 16 × 8 Top Partition | | 2 |
| | 16 × 8 Bottom Partition | | 3 |
| | 8 × 16 Left Partition | | 4 |
| | 8 × 16 Right Partition | | 5 |
| | 8 × 8 Top Left Partition | 8 × 8 | 6 |
| | | 8 × 4 | 7 |
| | | 4 × 8 | 8 |
| | | 4 × 4 | 9 |
| | | DIRECT | 10 |
| | 8 × 8 Top Right Partition | 8 × 8 | 11 |
| | | 8 × 4 | 12 |
| | | 4 × 8 | 13 |
| | | 4 × 4 | 14 |
| | | DIRECT | 15 |
| | 8 × 8 Bottom Left Partition | 8 × 8 | 16 |
| | | 8 × 4 | 17 |
| | | 4 × 8 | 18 |
| | | 4 × 4 | 19 |
| | | DIRECT | 20 |
| | 8 × 8 Bottom Right Partition | 8 × 8 | 21 |
| | | 8 × 4 | 22 |
| | | 4 × 8 | 23 |
| | | 4 × 4 | 24 |
| | | DIRECT | 25 |
| | Reserved | | 45:26 |

The command FIFO also has early termination strategies, which could be efficiently used to speed up the motion refinement intelligently. These could be used directly in conjunction with the motion search module 204 or with the intervention of the processor 200 to suit the algorithmic needs. These are as follows:

a. BEST MB PARTITION: This is the super fast mode, which chooses only the best mode as indicated by the motion search to perform refinement on. Motion refinement only looks at the particular partition that are in the in the threshold table that are set based on the motion search results for the BEST partition only one frame or field.

b. THRESHOLD ENABLE: This flag is used to enable the usage of the threshold information in a motion search MS Stats Register. If this bit is ON, the motion refinement engine 175 performs refinement ONLY for the modes specified in the threshold portion of the MS Stats Register. This bit works as follows. For each of the Top/Bottom, Frame/Field MBs, do the following:

If any of the partition bits (any of 16×16, 16×8, 8×16, 8×8) are enabled in the threshold portion of the MS Stats Register (this means that thresholds have been met for those partitions), do all those enabled partitions irrespective of the PARTITION bits in the Command FIFO. For the MBAFF OFF case, when the 8×8 bit is set, refinement is done ONLY for the best sub partition as specified in a hint table for each of the 8×8 partitions. Motion refinement only looks at particular partitions that are in the threshold table that are set based on the motion search results for those partitions that meet the threshold.

Figure 11:
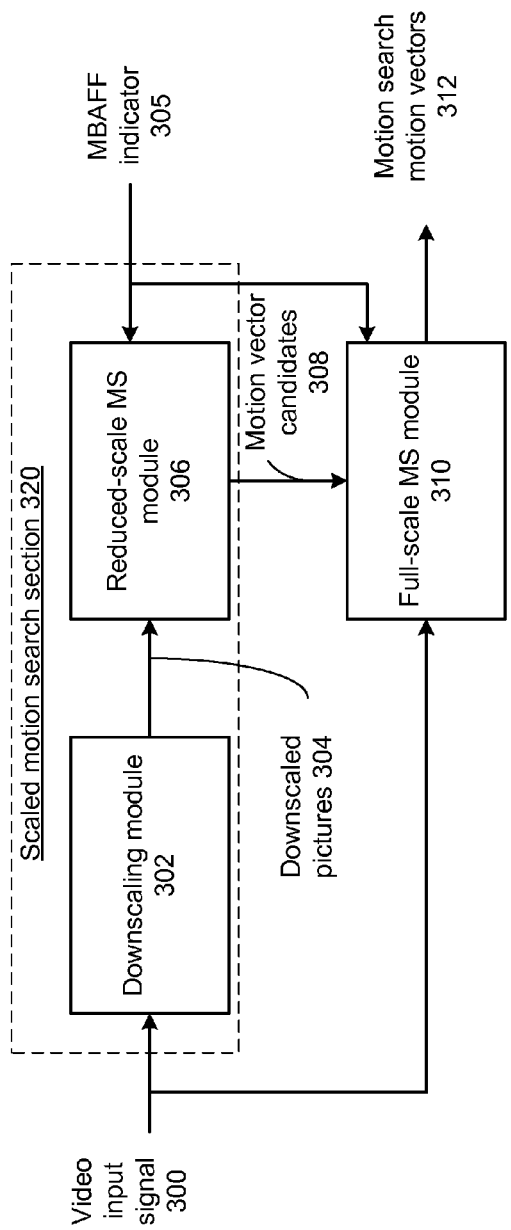
FIG. 11 presents a block diagram representation of a scaled motion search section 320 in accordance with an embodiment of the present invention.

FIG. 11 presents a block diagram representation of a scaled motion search section 320 in accordance with an embodiment of the present invention. In particular, scaled motion search section 320, processes a video input signal 300 that includes a plurality of pictures including current pictures and reference pictures. Downscaling module 302 downscales the plurality of pictures to generate a plurality of downscaled pictures 304. The reduced-scale motion search module 306 receives a macroblock adaptive frame and field indicator 305 having a first state that indicates a macroblock adaptive frame and field mode is enabled and a second state that indicates the macroblock adaptive frame and field mode is disabled. The reduced-scale motion search module 306 is adapted based on the macroblock adaptive frame and field indicator 305. Reduced-scale motion search module 306 generates a plurality of motion vector candidates 308 at a downscaled resolution, based on the plurality of downscaled pictures 304 and further based on the macroblock adaptive frame and field indicator 305. Full-scale motion search module 310, such as motion search module 204 generates a plurality of motion search motion vectors 312 at full resolution, based on a plurality of pictures and further based on the plurality of motion vector candidates 308.

The operation of the scaled motion search section 320 can be further described in conjunction with the following example that includes many optional functions and features. FIGS. 12-18 are presented in conjunction therewith.

In this example, scaled motion search section 320 is implemented in an AVC encoder/decoder and aims to speed up the full-scale motion search module 310 by utilizing the motion vector candidates 308 from the reduced scale motion search (MS) module 306 to make the real-time implementation possible while keeping an acceptable video quality. In an embodiment of the present invention, original frames rather than reconstructed frames are downscaled by downscaling module 302 and used as reference pictures in the reduced-scale MS module 306. Accordingly, the reduced-scale MS module 306 can generate motion vector candidates 308 one picture ahead of the full-scale motion search module. Therefore, the reduced-scale motion search module 306 and the full-scale motion search module 310 can be implemented in a parallel pipelined configuration in hardware. In addition, using the motion vector candidates 308, the full-scale motion search module 310 can perform its search over a small range. Hence, by doing the coarse motion search on a downscaled down picture, the motion search section 320 can obtain faster performance while keeping good picture quality and field information.

This example includes the following assumptions:
In the downscaling module 302, the current and reference pictures are both downscaled by 4 in the horizontal and vertical directions.
The reduced-scale motion search module 306 operates on a 4×4 block pair (4×8) of the downscaled current picture at a time. It searches for the best possible match of each 4×4 block with the one that differs temporally and spatially. The search range for P and B frames (slices) is 64×65 and is performed on the luma component, but not the chroma component.
A smaller search is performed by full-scale MS module 310 on a macroblock (MB) or a MB pair at a time. The search range is set as 9×9 for both P and B frames and the search is performed on the luma component, but not the chroma component.

In operation of scaled motion search section 320, in accordance with this example, can be described in conjunction with the following four steps.
1. Fetch the current picture from a frame buffer (FB).
2. Downscale the current frame via downscaling module 302. If the current picture is an I or P frame, also use the downscaled version as the reference picture for the following P or B frames.
3. For every P and B frame, perform the following in the reduced scale MS module 306:
    For each 4×4 block pair within the downscaled current picture, perform the following:
        Set the initial minimum cost to the highest possible value ((1<<17)−1) for the top frame block, bottom frame block, top field block and bottom field block of the 4×4 block pair.
        Reduced-scale motion search is performed to find the best match between the current block and a corresponding region in the reference frames. At each search point, calculate the total cost for the top frame block, bottom frame block, top field block, bottom field block. For each of the four total costs, if it is smaller than the minimum cost, update it to the minimum cost.
        If macroblock adaptive frame field (MBAFF) is off, store the best motion vector and cost for the top frame block and bottom frame block.
        If MBAFF is on, store the best motion vector and cost for the top frame block, bottom frame block, top field block and bottom field block.
        Calculate the frame cost by adding the top frame block cost to the bottom frame block cost.
        Calculate the field cost by adding the top field block cost and bottom field cost.
        Compare the frame cost with the field cost and select the coding type (frame/field coding) with the lower cost for the 4×4 block pair.
4. In the Full-scale MS module 310, a small search (search range is 9×9) is performed on each MB (or MB pair) based on the corresponding motion vector obtained from Reduced-scale MS module 306.

Figure 12:
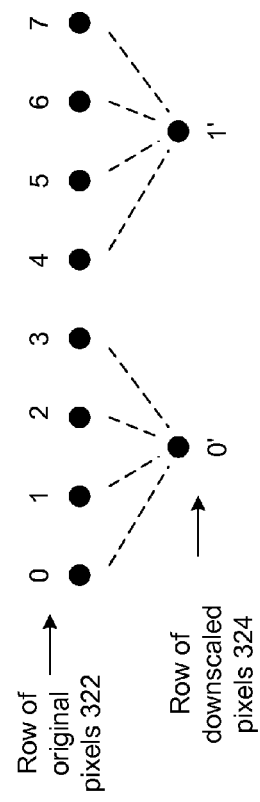
FIG. 12 presents a graphical representation of horizontal downscaling in accordance with an embodiment of the present invention.
Figures 13, 14:
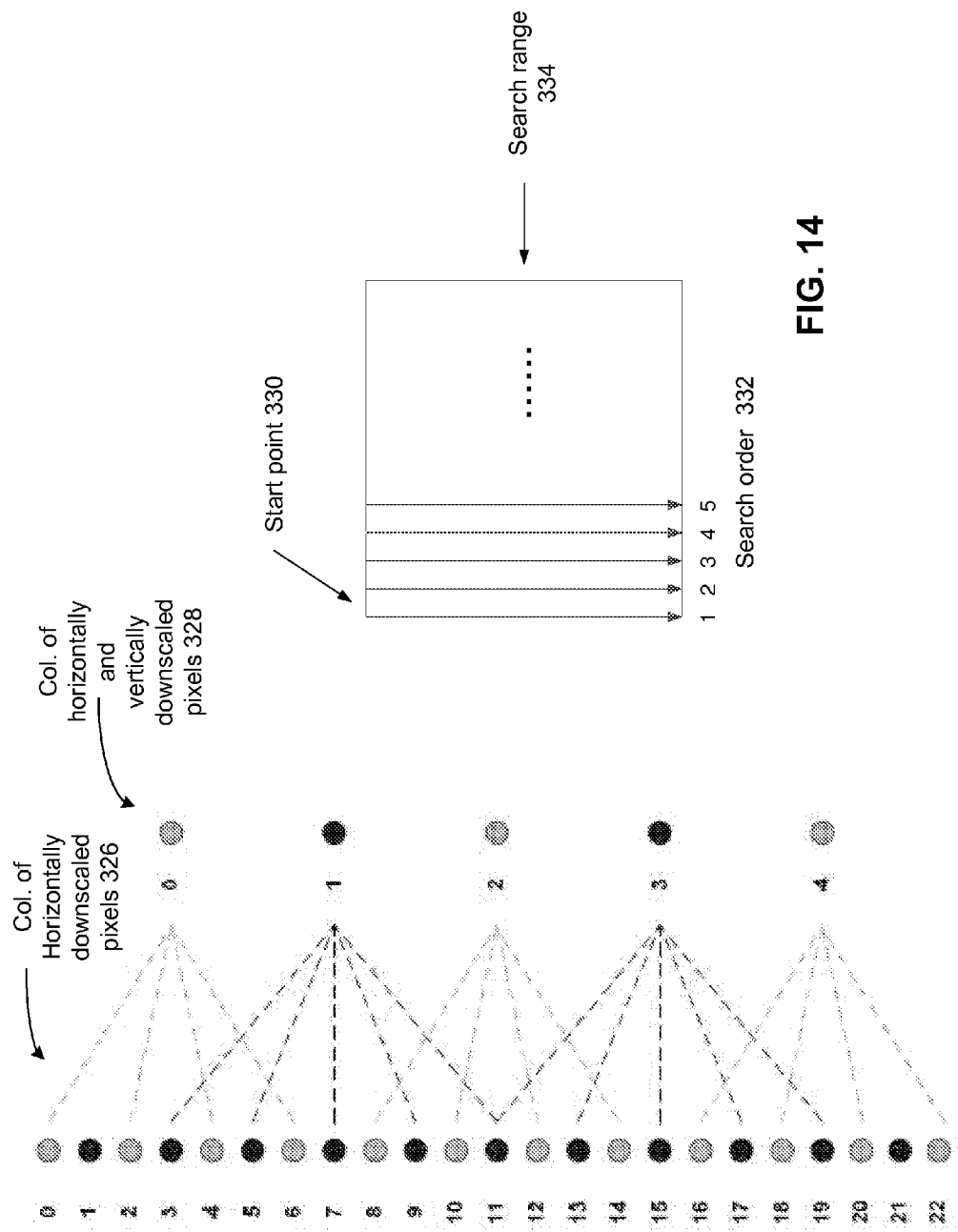
FIG. 13 presents a graphical representation of vertical downscaling in accordance with an embodiment of the present invention.
FIG. 14 presents a graphical representation of motion search within a search range in accordance with an embodiment of the present invention.

FIGS. 12 and 13 present graphical representations of horizontal and vertical downscaling in accordance with an embodiment of the present invention. In this example, downscaling module 302 downscales/down-samples the current and reference picture in both horizontal and vertical directions by 4 in such as fashion to make the downscaling effective for both progressive and interlaced pictures. As shown in FIG. 12, for each row of original pixels 322 of the original picture, single pixels in the row of downscaled pixels 324 are formed by averaging every four adjacent pixels. As shown, pixel 0' is formed by averaging pixels (0-3) and pixel 1' is formed by averaging pixels (4-7).

In FIG. 13, each column of horizontally downscaled pixels 326 of the horizontally downscaled picture, is then vertically downscaled to generate a column of horizontally and vertically downscaled pixels 328 in the same column of the final downscaled picture. In this example, downscaling module 302 operates to:
1. Average the 0th, 2nd, 4th, 6th pixels to get the 0th pixel.
2. Average the 8th, 10th, 12th, 14th pixels to generate the 2nd pixel.
3. Average the 3rd, 5th, 7th, 9th, 11th pixels with corresponding weighted factors ½, 1, 1, 1, and ½ to form the 1st pixel.
4. Average the 11th, 13th, 15th, 17th, 19th pixels with corresponding weighted factors ½, 1, 1, 1, and ½ to generate the 3rd pixel.
5. Perform the same vertical downscaling for other pixels in the same column. Note that the last row of the horizontally downscaled picture needs to be copied twice to have enough rows for the vertical downscaling.

FIG. 14 presents a graphical representation of motion search within a search range in accordance with an embodiment of the present invention. In particular, the reduced scale MS module 306 operates on a 4×4 block pair of the downscaled current picture to find the best match between the current block and a corresponding region in the reference frames. At each search point within the search range, it will calculate a Sum of Absolute Differences (SAD) value and motion vector cost. The search point with the lowest total cost is considered to be the best match. In this example, the reduced scale MS module 306 performs the following.
1. Set the search range to 64×65 (32 pixels on the left-hand side of the start motion vector and 31 pixels on the right-hand side of the start motion vector, 32 pixels above the start motion vector and 32 pixels below the start motion vector) for both P and B slices.
2. Set the start motion vector to (0, 0) and set lambda to 1.
3. The search order will start at the top-left of the search range, and then proceed down an entire column. It will shift to the right column and begin at the top again while the end of the current column is reached. Repeat the same procedure until the entire search range is covered. If parts of a search range are located out of the reference frame boundary, then copy the pixels from the closest boundary for that area. The pixels located at the corners will be filled with the pixels on the horizontal boundary. FIG. 14 depicts the search order 332 of the pre-motion search process within search range 334 and beginning at start point 330.

4. The horizontal and vertical motion vector costs are calculated in the same manner. First of all, the difference between the current motion vector and the predicted motion vector is calculated. If the difference is 0, return 1 as the number of bits. Otherwise, right shift its absolute value by 1 (denoted as n), then perform the following
   Step 1: Set the initial value of variable k as 3
   Step 2: Left shift n by 1
   Step 3: If the result of step 2 is not equal to 0, increase k by 2 and repeat step 2. Otherwise, go to step 4
   Step 4: Return the value of k as the number of bits
   Step 5: Multiply the number of bits by lambda to generate the cost 5. When MBAFF is off as indicated by MBAFF indicator 305, perform search for each 4×4 block pair of the downscaled picture to find the best match. The quality of each search is determined by using SAD. At each search point in the downscaled reference picture, perform the following
   Calculate the SAD by comparing the current block pair with the reference block pair and store the SAD values for the top block and bottom block separately.
   Calculate the total costs for the top block and bottom block by adding the corresponding motion vector cost and the SAD value.
   For the top and bottom blocks, compare its total cost value with the current minimum cost. If the total cost is smaller, update the minimum cost to the total cost and store the corresponding motion vector.

6. After the search, the best motion vectors for the top and bottom blocks are obtained.

Figure 15:
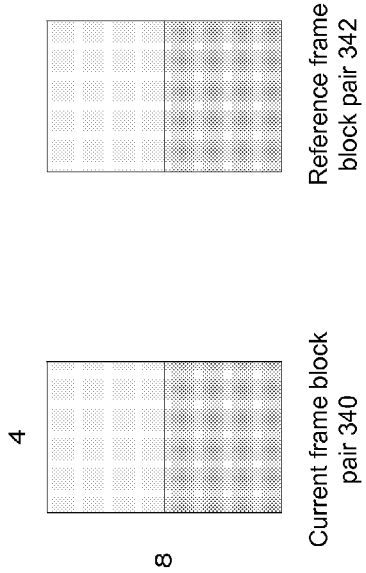
FIG. 15 presents a graphical representation of current frame and reference frame block pairs in accordance with an embodiment of the present invention.
Figure 16:
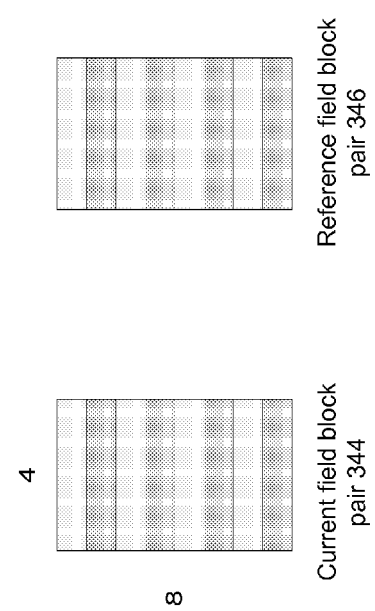
FIG. 16 presents a graphical representation of current field and reference field block pairs in accordance with an embodiment of the present invention.

7. When MBAFF is on as indicated by MBAFF indicator 305, perform search for each 4×4 block pair of the downscaled picture. At each search point, it requires searching in frame and field mode simultaneously. The SAD is calculated on a 4×4 block basis.
   In the case of frame as shown in FIG. 15, perform the following:
   Calculate the SAD by comparing the current frame block pair 340 with the reference block pair 342 and store the SAD values for the top frame block and bottom frame block separately.
   Calculate the total costs for the top frame block and the bottom frame block by adding the corresponding motion vector cost to the SAD value.
   For the top and bottom frame blocks, compare its total cost value with the current minimum cost. If the total cost is smaller, update the minimum cost to the total cost and store the corresponding motion vector.
   For the field case shown in FIG. 16, two field blocks are constructed by taking every other line.
   Calculate the SAD by comparing the current field block pair 344 with the reference block pair 346 and store the SAD values for the top field block and bottom field block separately.
   Calculate the total costs for the top field block and the bottom field block by adding the corresponding motion vector cost to the SAD value.
   For the top and bottom field blocks, compare its total cost value with the current minimum cost. If the total cost is smaller, update the minimum cost to the total cost and store the corresponding motion vector.
   Note that in either of the above cases, two SAD values are produced. One for the top frame block or the top field block, and the other for the bottom frame block or the bottom field block. The absolute difference for each pixel is done the same way; it is just how the sums are accumulated that determines the frame or field SAD values.

8. After the search, the motion vector candidates 308 are generated as the best motion vectors of the top frame block, top field block, bottom frame block and bottom field block for the 4×4 block pair.

As discussed above, motion vector candidates 308 for each 4×4 block of the downscaled current picture are obtained from the reduced-scale MS module 306. Therefore, the motion vector candidates 308 are available before the full-scale motion search is performed for the current P or B frame. Full-scale MS module 310 uses these motion vector candidates 308 to find the motion search motion vectors 312 as follows.

1. The search range is set as 9×9 (4 pixels on the left side of start motion vector and 4 pixels on the right side of the start motion vector, 4 pixels above the start motion vector and 4 pixels below the start motion vector) for both P and B slices.

2. The search order will start at the top-left of the search range, and then proceed down an entire column. It will shift to the right column and begin at the top again while the end of the current column is reached. Repeat the same procedure until the entire search range is covered. If parts of a search range are located out of the reference frame boundary, then copy the pixels from the closest boundary for that area. The pixels located at the corners will be filled with the pixels on the horizontal boundary.

Figure 18:
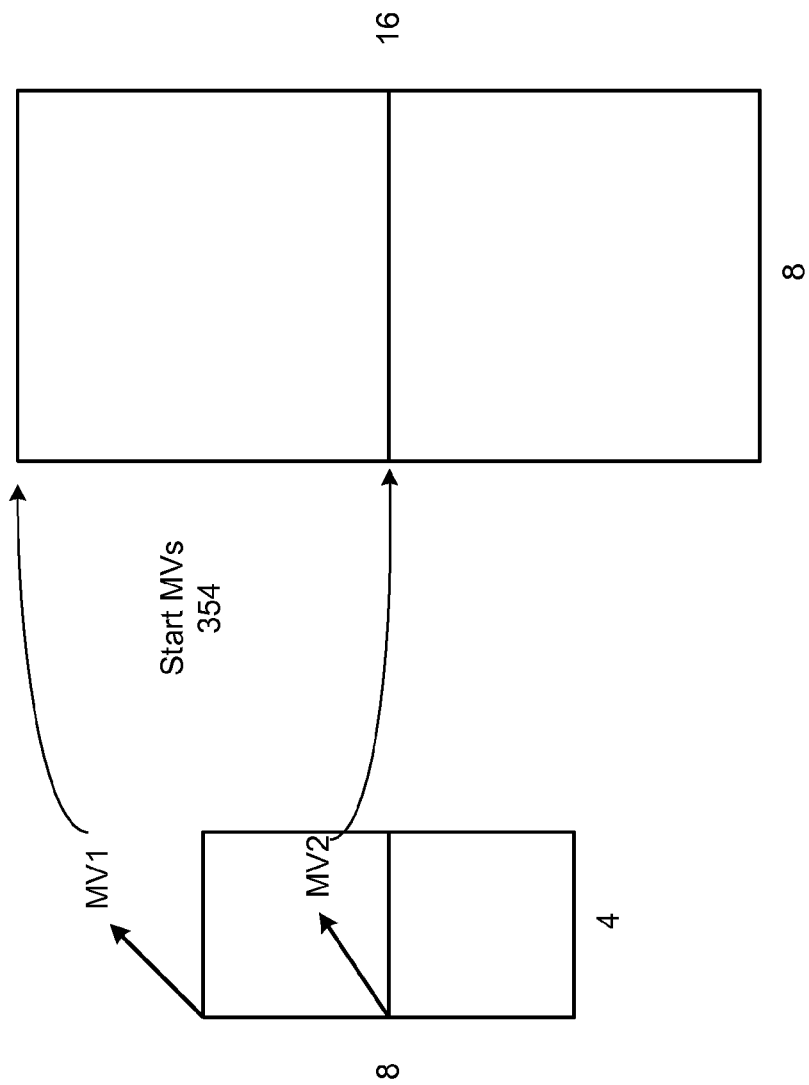
FIG. 18 presents a graphical representation of motion vector candidate allocation in accordance with another embodiment of the present invention.

3. When MBAFF is off as indicated by MBAFF indicator 305, for each MB, upscale the corresponding candidate motion vector MV1 and MV2 by left shifting both the horizontal and vertical components by 2. Using the corresponding up-scaled candidate motion vectors MV1 and MV2 as the start motion vectors 354, perform a small search within the corresponding search ranges 9×9 to find the best match for each MB of the current picture as shown in FIG. 18.

Figure 17:
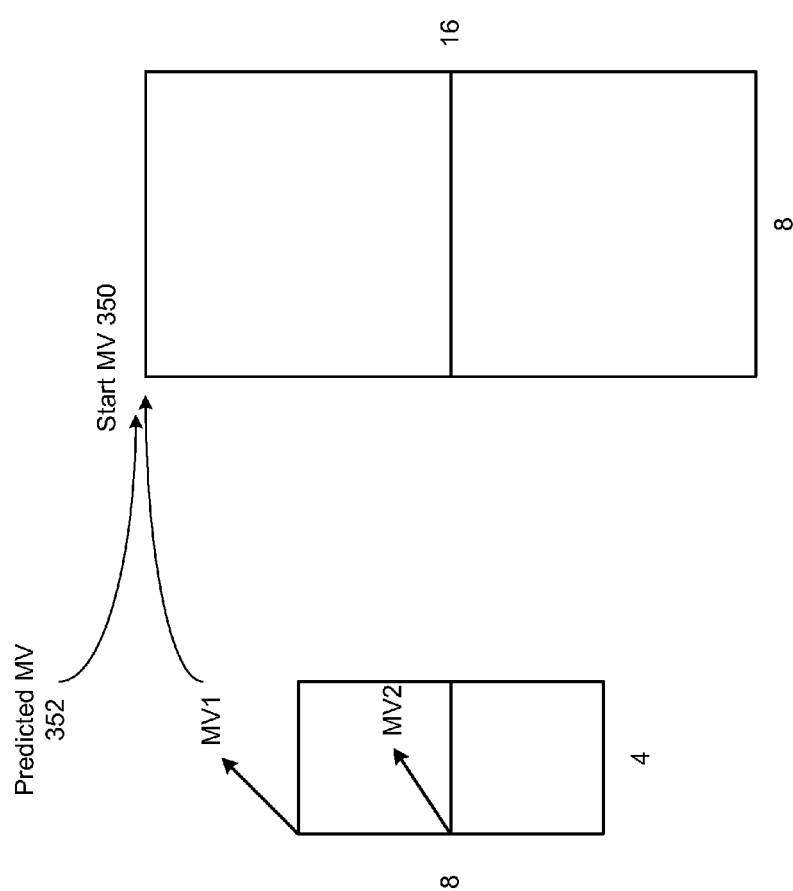
FIG. 17 presents a graphical representation of motion vector candidate allocation in accordance with an embodiment of the present invention.

4. When MBAFF is on as indicated by MBAFF indicator 305, upscale the corresponding top candidate motion vector MV1 as the start motion vector. Perform two small searches for the each MB pair. One uses the up-scaled top candidate motion vector MV1 as the start motion vector 350, the other uses the predicted motion vector 352 as the start motion vector 350 as shown in FIG. 17.

FIG. 19 presents a block diagram representation of a motion refinement section 360 in accordance with another embodiment of the present invention. In particular, a motion refinement section 360 is shown, such as motion refinement module 206. A partition subset selection module 362 selects a subset of available partitions 364 for a macroblock pair of the plurality of macroblock pairs, based on motion search motion vectors 312 or other motion search motion vectors, and further based on macroblock adaptive frame and field indicator 305 and the picture type. In an embodiment of the present invention, the partition subset selection module 362 is adapted to select one of three modes of operation as follows:

1. A first mode is selected when the picture indicator indicates a B picture type and the macroblock adaptive frame and field indicator 305 indicates the macroblock adaptive frame and field enabled state.
2. A second mode is selected when the picture indicator indicates a P picture type and the macroblock adaptive frame and field indicator indicates the macroblock adaptive frame and field enabled state.
3. A third mode is selected when the macroblock adaptive frame and field indicator indicates the macroblock adaptive frame and field disabled state.

A motion refinement module 366 generates refined motion vectors 368 for the macroblock pair, based on the subset of available partitions 364 for a macroblock pair.

The operation of the motion refinement section 360 can be further described in conjunction with the following example that includes many optional functions and features. FIGS. 20 and 21 are presented in conjunction therewith.

In this example, motion refinement section 360 is implemented in an AVC encoder/decoder. Without the section of partition subsets, motion refinement section 360 could potentially perform refinement for each partition for frame and field mode (1 partition for 16×16 mode; 2 partitions for 16×8 mode; 2 partitions for 8×16 mode; 4 partitions for 8×8 mode) for the Top Frame MB, Bottom Frame MB, Top Field MB and Bottom Field MB. Therefore, a large number of refinements need to be performed, especially for encoding the high resolution video. In order to reduce the computational complexity, partition subset selection module 362 eliminates partitions that are unlikely to be chosen, which reduces the computations and time needed by motion refinement module 366, while maintaining good picture quality.

From the motion search motion vectors 312, motion refinement section 360 obtains information on the best of the following:
1) Forward or backward directions for each of 16×16/16×8/8×16/8×8 partitions for each MB pair
2) Frame or field selection for each MB pair
3) Best motion vectors and costs for each of 16×16/16×8/8×16/8×8 partitions for each MB pair Partition subset selection module 362 selects the subset of available partitions 364 with corresponding motion search motion vectors 312' for use by motion refinement module 366. Partition subset selection module 362 determines one of three modes of operation based on the MBAFF indicator 305 and the picture type.

Mode 1—P slices when MBAFF is ON
Mode 2—B slices when MBAFF is ON
Mode 3—P and B Slices when MBAFF is OFF Each mode of operation of partition subset selection module 362 will be discussed below in accordance with this example. FIGS. 20 and 21 present graphical representations of the 16×8, 8×16 and 8×8 modes of macroblock partitioning used herein and the variables used for the corresponding motion vector components.

Mode 1—P Slices when MBAFF is ON
For each MB in a MB pair there several possibilities:
1) Field and Frame
2) Top and Bottom MB
3) 9 partitions Therefore, there are 2×2×9=36 available partitions for each MB pair. Partition subset selection module 362 operates in Mode 1 to eliminate selected ones of these possible combinations in accordance with the steps below.

Step 1. Initial Setting:
1) Set the motion vector Threshold to 2 full-pixel units.
2) Set Max value to 33554431.
3) Set Threshold to 0.
4) Set FrmTh to 0.
5) Set FldTh to 100.

Step 2. For every MB pair, calculate the lowest frame cost and the lowest field cost for all modes for both top and bottom MBs by using the best costs for each of 16×16/16×8/8×16/8×8 partitions provided by motion search motion vectors 312. This step generates the cost of 16×16 mode, cost of 16×8 mode, cost of 8×16 mode and code of 8×8 mode for each MB (the Top Frame MB, Bottom Frame MB, Top Field MB and Bottom Field MB).

Step 3. For Top Frame MB, Bottom Frame MB, Top Field MB and Bottom Field MB, perform the following:
1) Check the 16×16 cost, if it is the lowest cost, set the 16×8, 8×16 and 8×8 costs to Max.
2) Else if the 16×8 (8×16) cost is the lowest cost, check the absolute differences for both horizontal and vertical motion vector components between the two partitions. As shown in FIG. 20, denote the left (top) partition as partition_0 and the right (bottom) partition as partition_1 in 16×8 (8×16) mode. Also denote the motion vectors for the partition_0 and partition_1 as (x0, y0) and (x1, y1), respectively. The absolute differences dx and dy are calculated as dx=|x0−x1| and dy=|y0−y1|.
   a) If both dx and dy are lower than the MV Threshold, and the 16×16 cost is not the highest one, set the 16×8, 8×16 and 8×8 costs to Max.
   b) Otherwise, set the 8×16(16×8) and 8×8 costs to Max.
3) Else if the 8×8 cost is the lowest one, denote the four partitions from left to right and from top to bottom as partition_0, partition_1, partition_2 and partition_3. If the 8×8 cost is the lowest cost, check the absolute differences for both horizontal and vertical motion vector components between the partition_0 and partition_1, partition_2 and partition_3, partition_0 and partition_2, partition_1 and partition_3. As shown in FIG. 21, denote the motion vectors for the partition_0, partition_1, partition_2, partition_3 as (x0, y0), (x1, y1), (x2, y2) and (x3, y3), respectively. The absolute differences dx0, dy0, dx1, dy1, dx2, dy2, dx3, dy3 are calculated as dx0=|x0−x1|, dy0=|y0−y1|, dx1=|x2−x3|, dy1=|y2−y3|, dx2=|x0−x2|, dy2=|y0−y2|, dx3=|x1−x3|, dy3=|y1−y3|.
   a) If all the absolute differences dx0, dy0, dx1, dy1, dx2, dy2, dx3, dy3 are lower than the MV Threshold, check the 16×16 cost. If the 16×16 cost is not the highest one, set the 16×8, 8×16 and 8×8 costs to Max. Otherwise, set the 8×16 and 8×8 costs to Max.
   b) Else if only dx0, dy0, dx1, dy1 are lower than the MV Threshold, check the 16×8 cost. If the 16×8 cost is not the highest one, set the 16×16, 8×16 and 8×8 costs to Max. Otherwise, set the 16×8 and 8×16 costs to Max.
   c) Else if only dx2, dy2, dx3, dy3 are lower than the MV Threshold, check the 8×16 cost. If the 8×16 cost is not the highest cost, set the 16×16, 16×8 and 8×8 costs to Max. Otherwise, set the 16×8 and 8×16 costs to Max.
   d) Otherwise, set the 16×8 and 8×16 costs to Max.

Step 4. Perform the following for Top Frame MB, Bottom Frame MB, Top Field MB, and Bottom Field MB:
1) If 16×16 cost is the lowest cost, eliminate all partitions of the mode whose cost is higher than this cost by Threshold.
2) Else if 16×8 cost is the lowest one, eliminate all partitions of the mode whose cost is higher than this cost by Threshold, but do not eliminate 16×16 mode.
3) Else if 8×16 cost is the lowest one, eliminate all partitions of the mode whose cost is higher than this cost by Threshold, but do not eliminate 16×16 mode.
4) Else if 8×8 cost is the lowest one, eliminate all partitions of the mode whose cost is higher than this cost by Threshold, but do not eliminate 16×16 mode.

Step 5. Eliminate Frame or Field modes using the following method:
1) If Frame is better as specified by the motion search in the Hint Table, if the lowest field cost is higher than the frame cost by a threshold (FrmTh), then eliminate all the field modes. Currently the FrmTh is set to 0. This means that whenever frame is better eliminate the field modes.
2) If Field is better as specified by the motion search in the Hint Table, if the lowest frame cost is higher than the field cost by a threshold (FldTh), then eliminate all the frame modes.

Mode 2—B Slices when MBAFF is ON
For each MB in a MB pair there several possibilities:
1) Forward and Backward
2) Field and Frame
3) Top and Bottom MB
4) 9 partitions Therefore, there are 2×2×2×9=72 available partitions for each MB pair. Partition subset selection module 362 operates in Mode 2 to eliminate selected ones of these possible combinations in accordance with the steps below.

Step 1. Initial Setting:
1) Set MV Threshold to 2 full pixel units.
2) Set Max value to 33554431.
3) Set Threshold to 0.
4) Set FrmTh to 0.
5) Set FldTh to 100.

Step 2. For every MB Pair:
1) Calculate the lowest Frame Cost and the lowest Field Cost for all modes for both top and bottom MBs by using the best costs for each of 16×16/16×8/8×16/8×8 partitions provided by motion search motion vectors 312. This step generates the cost of 16×16 mode, cost of 16×8 mode, cost of 8×16 mode and code of 8×8 mode for the Top Frame MB, Bottom Frame MB, Top Field MB and Bottom Field MB.
2) Store the corresponding search direction (Forward or Backward) for each partition whose cost comprises the above Lowest Costs.

Step 3. Use the same method applied for P slices.

Step 4. Perform the following for Top Frame MB, Bottom Frame MB, Top Field MB, and Bottom Field MB:
1) If 16×16 cost is the lowest cost, eliminate all partitions of the mode whose cost is higher than this cost by Threshold in both forward and backward directions.
2) Else if 16×8 cost is the lowest one, eliminate all partitions of the mode whose cost is higher than this cost by Threshold in both forward and backward directions, but do not eliminate 16×16 mode.
3) Else if 8×16 cost is the lowest one, eliminate all partitions of the mode whose cost is higher than this cost by Threshold in both forward and backward directions, but do not eliminate 16×16 mode.
4) Else if 8×8 cost is the lowest one, eliminate all partitions of the mode whose cost is higher than this cost by Threshold in both forward and backward directions, but do not eliminate 16×16 mode.

Step 5. Eliminate Frame or Field modes using the following method:
1) If frame is better as specified by the MS in the Hint Table, if lowest field cost is higher than the frame cost by a threshold (FrmTh), then eliminate all the field modes. Currently the FrmTh is set to 0. This means that whenever frame is better eliminate the field modes.
2) If field is better as specified by the MS in the Hint Table, if lowest frame cost is higher than the field cost by a threshold (FldTh), then eliminate all the frame modes.

Mode 3—P and B Slices when MBAFF is OFF
When MBAFF is off, the concept of Top/Bottom and Frame/Field MB will not be taken into account. Otherwise, the techniques described above (without regard to Top/Bottom and Frame/Field) can be applied to P and B slices to selectively eliminate partitions for every MB.

Figure 22:
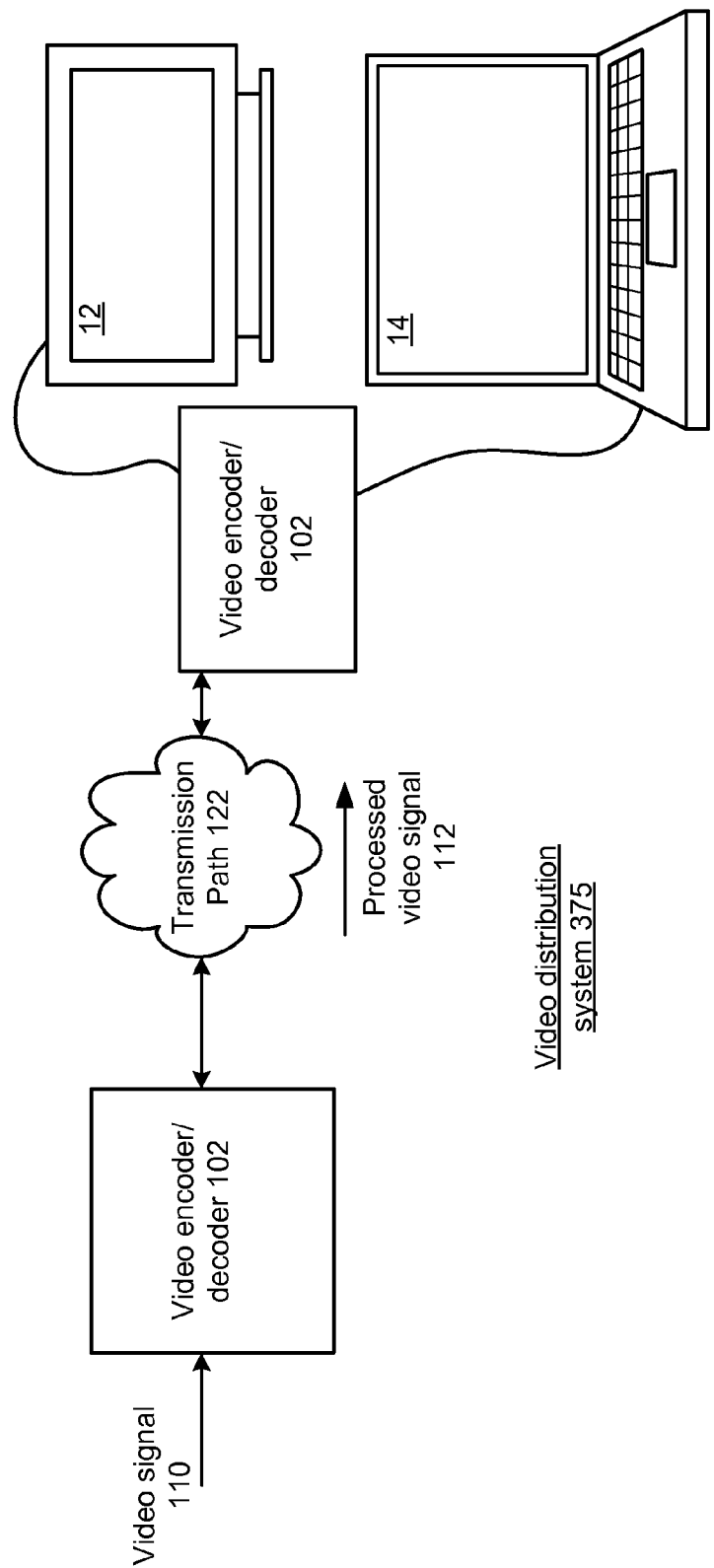
FIG. 22 presents a block diagram representation of a video distribution system 375 in accordance with an embodiment of the present invention.

FIG. 22 presents a block diagram representation of a video distribution system 375 in accordance with an embodiment of the present invention. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 23:
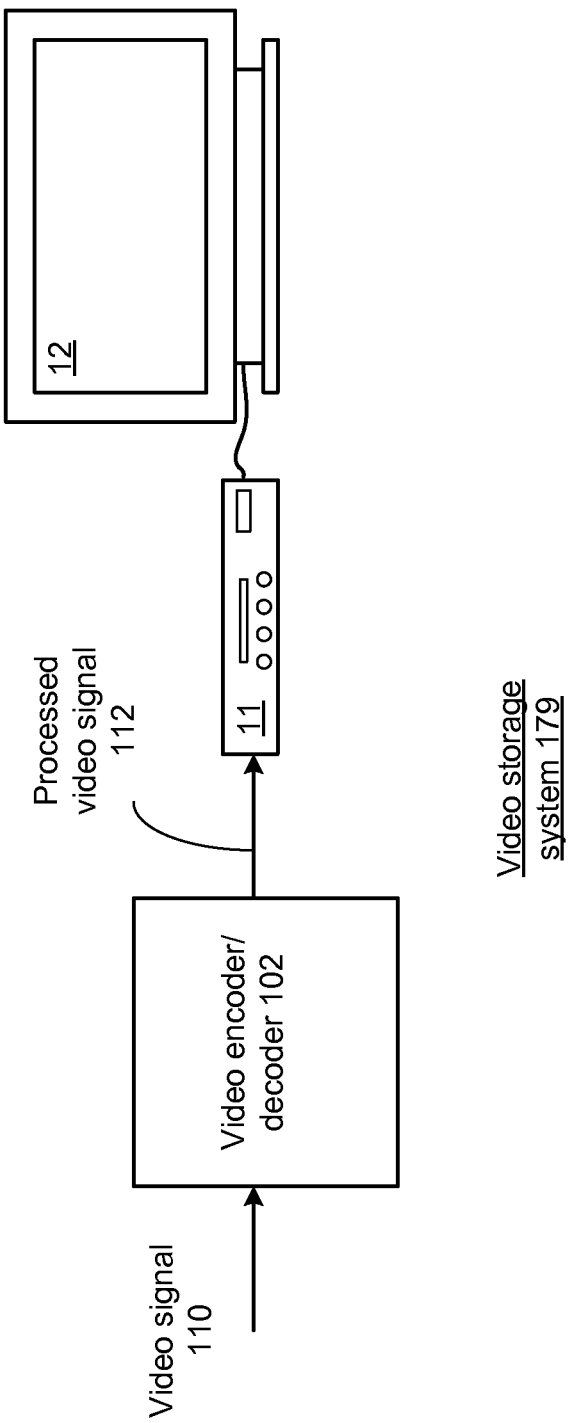
FIG. 23 presents a block diagram representation of a video storage system 179 in accordance with an embodiment of the present invention.

FIG. 23 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 24:
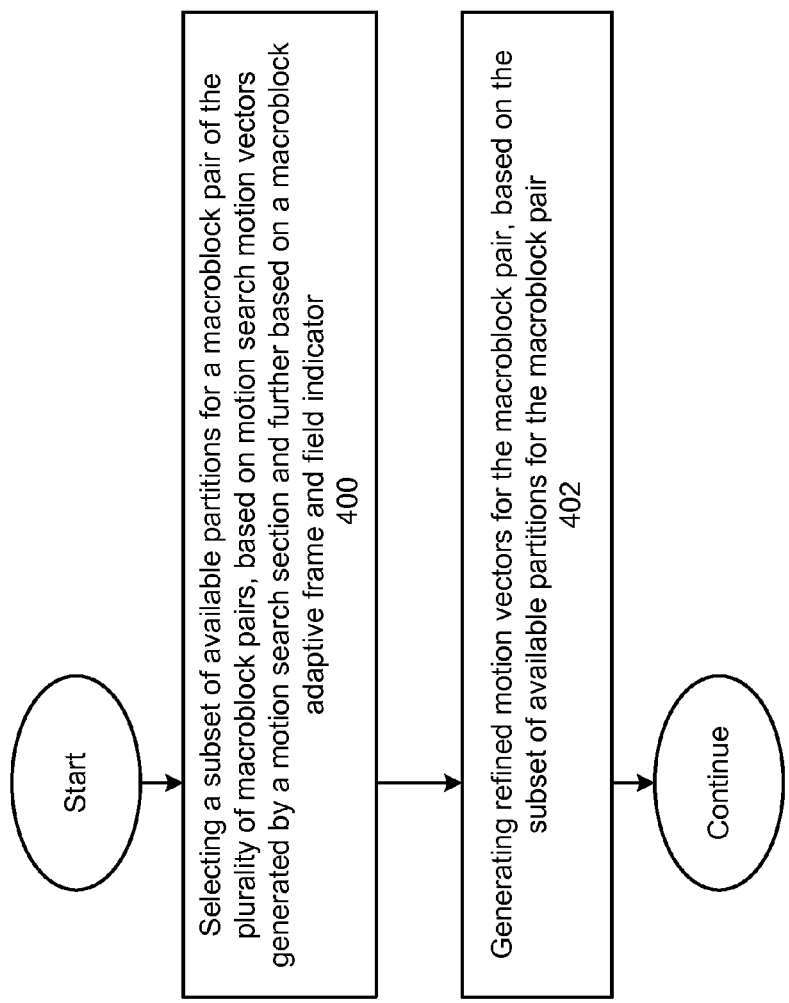
FIG. 24 presents a flowchart representation of a method in accordance with an embodiment of the present invention.

FIG. 24 presents a flowchart representation of a method in accordance with an embodiment of the present invention. In particular, a method is presented for use in conjunction with a video processing device having one or more of the features and functions described in association with FIGS. 1-23. In step 400, a subset of available partitions is selected for a macroblock pair of the plurality of macroblock pairs, based on motion search motion vectors generated by a motion search section, and further based on a macroblock adaptive frame and field indicator. In step 402, refined motion vectors are generated for the macroblock pair, based on the subset of available partitions for the macroblock pair.

In an embodiment of the present invention, the macroblock adaptive frame and field indicator indicates one of: a macroblock adaptive frame and field enabled state; and a macroblock adaptive frame and field disabled state. Step 400 can further be based on a picture indicator that indicates a picture type. In particular, step 400 can operate in a first mode when the picture indicator indicates a B picture type and the macroblock adaptive frame and field indicator indicates the macroblock adaptive frame and field enabled state. Step 400 can operate in a second mode when the picture indicator indicates a P picture type and the macroblock adaptive frame and field indicator indicates the macroblock adaptive frame and field enabled state. Step 400 can operate in a third mode when the macroblock adaptive frame and field indicator indicates the macroblock adaptive frame and field disabled state.

Figure 25:
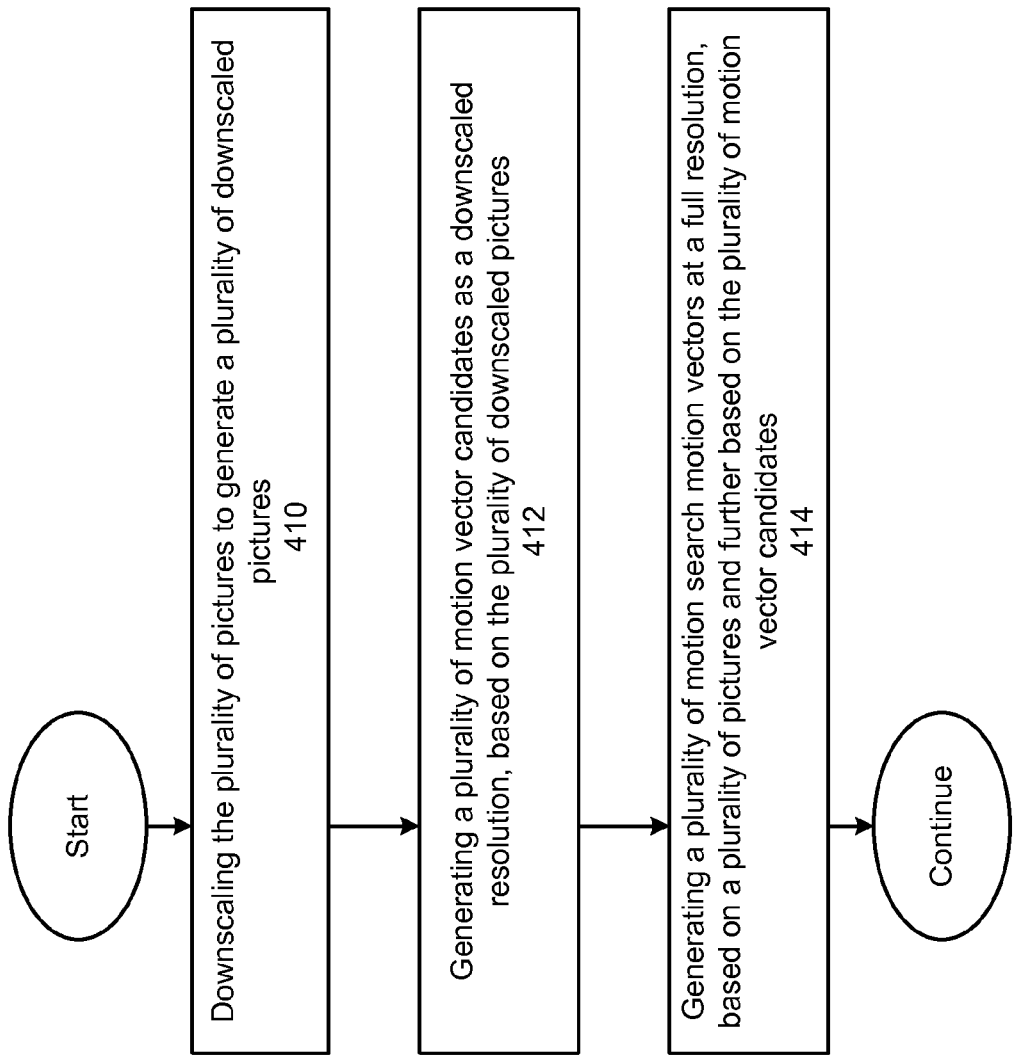
FIG. 25 presents a flowchart representation of a method in accordance with an embodiment of the present invention.

FIG. 25 presents a flowchart representation of a method in accordance with an embodiment of the present invention. In particular, a method is presented for use in conjunction with a video processing device having one or more of the features and functions described in association with FIGS. 1-24. In step 410, the plurality of pictures are downscaled to generate a plurality of downscaled pictures. In step 412, a plurality of motion vector candidates are generated at a downscaled resolution, based on the plurality of downscaled pictures. In step 414, a plurality of motion search motion vectors are generated at a full resolution, based on a plurality of pictures and further based on the plurality of motion vector candidates.

In an embodiment of the present invention, steps 412 and 414 are performed in parallel via pipelined processing. Step 410 can include downscaling in a vertical direction and downscaling in a horizontal direction. The plurality of motion vector candidates can be generated based on a first search range and the plurality of motion search motion vectors can be generated based on a second search range, wherein the first search range is greater than the second search range. The plurality of motion vector candidates can be generated based on only the luma component (and not the chroma component) of the plurality of downscaled pictures. Further the plurality of motion search motion vectors are generated based on only the luma component (and not the chroma component) of the plurality of reference pictures.

Step 412 can be adapted based on a macroblock adaptive frame and field indicator having a first state that indicates a macroblock adaptive frame and field mode is enabled and a second state that indicates the macroblock adaptive frame and field mode is disabled.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video processing device, a video encoder/decoder and deblocking filter module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A motion refinement section for use in a video processing device that processes a video input signal that includes a plurality of pictures each having a plurality of macroblock pairs, the motion refinement section comprising:
   a partition subset selection module that, when a macroblock adaptive frame and field indicator indicates a macroblock adaptive frame and field mode is selected, generates a selected subset of partitions of a macroblock pair of the plurality of macroblock pairs as a first subset of available partitions, and when the macroblock adaptive frame and field indicator indicates the macroblock adaptive frame and field mode is deselected, generates the selected subset of partitions as a second subset of available partitions, wherein the first subset is different from the second subset; and
   a motion refinement module, coupled to the partition subset selection module, that generates refined motion vectors for the macroblock pair, based on the selected subset of partitions for a macroblock pair, by refining motion search motion vectors for the macroblock.

2. The motion refinement section of claim 1 wherein the partition subset selection module selects the first subset of available partitions for the macroblock pair further based on a picture indicator that indicates a picture type.

3. The motion refinement section of claim 2 wherein the partition subset selection module selects the first subset as a group of first partitions when the picture indicator indicates a B picture type and the macroblock adaptive frame and field indicator indicates the macroblock adaptive frame and field mode is selected.

4. The motion refinement section of claim 3 wherein the partition subset selection module selects the first subset as a group of second partitions when the picture indicator indicates a P picture type and the macroblock adaptive frame and field indicator indicates the macroblock adaptive frame and field enabled state.

5. The motion refinement section of claim 4 wherein the group of first partitions is different from the group of second partitions.

6. A method for use in a video processing device that processes a video input signal that includes a plurality of pictures each having a plurality of macroblock pairs, the method comprising:
  determining when a macroblock adaptive frame and field indicator indicates a macroblock adaptive frame and field mode is selected and when the macroblock adaptive frame and field indicator indicates the macroblock adaptive frame and field mode is deselected;
  generating a selected subset of partitions of a macroblock pair of the plurality of macroblock pairs as a first subset of available partitions when the macroblock adaptive frame and field indicator indicates the macroblock adaptive frame and field mode is selected,
  generating the selected subset of partitions as a second subset of available partitions, wherein the first subset is different from the second subset when the macroblock adaptive frame and field indicator indicates the macroblock adaptive frame and field mode is deselected, wherein the first subset is different from the second subset; and
  generating refined motion vectors for the macroblock pair, based on the selected subset of partitions for a macroblock pair, by refining motion search motion vectors for the macroblock pair.

7. The method of claim 6 wherein selecting the first subset of available partitions for the macroblock pair is further based on a picture indicator that indicates a picture type.

8. The method of claim 7 wherein selecting the first subset of available partitions for the macroblock pair selects a group of first partitions when the picture indicator indicates a B picture type and the macroblock adaptive frame and field indicator indicates the macroblock adaptive frame and field mode is selected.

9. The method of claim 8 wherein selecting the first subset of available partitions for the macroblock pair selects a group of second partitions when the picture indicator indicates a P picture type and the macroblock adaptive frame and field indicator indicates the macroblock adaptive frame and field mode is selected.

10. The method of claim 9 wherein the group of first partitions is different from the group of second partitions.

* * * * *